United States Patent [19]

Knopf et al.

[11] 4,195,167
[45] Mar. 25, 1980

[54] GRADIENT POLYMERS OF TWO OR MORE CYCLIC, ORGANIC, RING-OPENING, ADDITION POLYMERIZABLE MONOMERS AND METHODS FOR MAKING SAME

[75] Inventors: Robert J. Knopf; Kenneth L. Hoy, both of Saint Albans, W. Va.

[73] Assignee: Union Carbide Corporation, New York, N.Y.

[21] Appl. No.: 959,221

[22] Filed: Nov. 9, 1978

Related U.S. Application Data

[63] Continuation-in-part of Ser. No. 691,022, May 28, 1976, abandoned.

[51] Int. Cl.$^2$ ............................................. C08G 65/08
[52] U.S. Cl. .................................... 528/408; 526/273; 528/88; 528/95; 528/393; 528/409; 528/419
[58] Field of Search ................. 528/408, 409, 419, 87, 528/88, 95, 393; 526/273

[56] References Cited

U.S. PATENT DOCUMENTS

| | | | |
|---|---|---|---|
| 3,029,216 | 4/1962 | Bailey et al. | 260/42 |
| 3,682,865 | 8/1972 | Jenkins et al. | 260/75 EP |
| 3,804,881 | 4/1974 | Bassett et al. | 260/470 |
| 3,839,293 | 10/1974 | Knopf et al. | 260/77.5 AA |

*Primary Examiner*—Earl A. Nielsen
*Attorney, Agent, or Firm*—Franklyn Schoenberg

[57] ABSTRACT

Polymers which comprise polymer chains along which the proportion of mer units provided by a first heterocyclic monomer gradually increases in a given chain length as the proportion of mer units provided by a second heterocyclic monomer gradually decreases along said chain length. In one form, the portions of the polymers adjacent one end of the given chain lengths have about 100% of mer units provided by the first monomer and about 0% of mer units provided by the second monomer and the portions adjacent the other end of the given chain lengths have about 0% of mer units provided by the first monomer and about 100% of mer units provided by the second monomer. Additional forms of polymers are disclosed.

Process for producing such polymers comprising introducing at least one primarily polymerizable feed composition comprising at least one of the monomers described above from at least one primary feed source to a polymerization zone, the primary polymerizable feed composition continually varying in compositional content of the monomers therein during said continuous introduction; simultaneously adding to primary feed source at least one different secondary polymerizable feed composition comprising at least one different monomer as described above from at least one secondary feed source so as to continually change the compositional content of the polymerizable monomers in the primary polymerizable feed composition in the primary feed source; and continuously polymerizing the primary polymerizable feed composition introduced to the polymerization zone until desired polymerization has been achieved.

The method of this invention is particularly useful in controlling the ratio of primary to secondary hydroxyl terminal groups in the product.

30 Claims, 3 Drawing Figures

GRADIENT POLYMERS OF TWO OR MORE CYCLIC, ORGANIC, RING-OPENING, ADDITION POLYMERIZABLE MONOMERS AND METHODS FOR MAKING SAME

BACKGROUND OF THE INVENTION

1. Field Of The Invention

This invention relates to new types of ring-opened, addition organic polymers such as polyoxyethylenepolyoxypropylene polymers and methods for making them. In particular, the present invention is concerned with novel ring-opened, addition type polymers with controlled monomer sequence distributions and processes for making them.

2. Prior Art

A wide variety of polymers made from one or more cyclic, organic monomers capable of ring-opening, addition polymerization are in extensive use for a wide range of applications. For example, copolymers of ethylene oxide and propylene oxide represent a particularly fruitful area in which to apply the present invention as a tool for tailoring performance characteristics. This is so because these two monomers form respective homopolymers which, although generally similar in glass transition temperatures, are basically dissimilar in solubility characteristics. Poly(ethylene oxide) for example, is a water soluble polymer which hydrogen bonds extensively in aqueous solution. Poly(propylene oxide), on the other hand, is an oil soluble polymer with greatly reduced tendencies toward hydrogen bond formation. When these two monomers are copolymerized, therefore, the products which result exhibit both hydrophilic and hydrophobic character to an extent dependent upon both the overall composition and the structure of the copolymer in terms of monomer sequence distribution.

Block copolymers of ethylene oxide and propylene oxide have very distinct surface active characteristics. They are efficient surface tension reducers in aqueous solutions and function as surfactants, wetting agents, and emulsifiers. The block copolymer structure thus maximizes the performance characteristics of such copolymers in all areas which depend upon well-defined hydrophile and hydrophobe structure. There is currently marketed a broad line of such oxide copolymers, their product line being presented in the form of a grid whose axes are molecular weight of the hydrophobe block (propylene oxide block) and overall hydrophile content (weight percent ethylene oxide). As a further consequence of the block structure, these commercial copolymers have the ability to gel water solutions at certain rather high fluid concentrations. This property is utilized in the preparation of a broad line of clear ringing gels for applications such as antiseptics, cosmetics, sun-screening agents, hair bleaches and the like. Because of their structural homogeneity within the hydrophile and hydrophobe segments, block copolymers are often pastes or solids at ambient temperatures.

Conventional random copolymers of ethylene oxide and propylene oxide lack the pronounced surface active characteristics of their blocked counterparts. Thus, they have been much poorer reducers of surface tension in aqueous solutions and are generally poorer wetting agents, surfactants and emulsifiers. This behavior is a direct consequence of the random structure, which does not permit the formation of lengthy chains of either hydrophile or hydrophobe portions. Because of their structural heterogeneity, random copolymers are generally liquids at the same molecular weights and overall compositions where their blocked counterparts are solids or pastes. A considerable number of random ethylene oxide-propylene oxide copolymers are commercially available but, unlike the block copolymers, the random structures do not gel water. They find applications which stress their utility as functional fluids such as pump lubricants, quenching fluids in foundary operations, brake fluids, "pusher" fluids in drilling operations and the like. Inasmuch as these random structure fluids form homogeneous aqueous solutions, they can be used advantageously as base components for non-flammable functional fluids.

Heretofore, the only types of oxide copolymers known to the art have been the block and random types which, as we have seen, are characterized by widely divergent properties. The present invention is ideally suited to the preparation of an infinite number of different structural species intermediate between the block and random extremes. In accomplishing these structural alterations by this invention, it is observed that certain solution properties of these copolymers change accordingly. The present invention therefore represents a simple and convenient means for tailoring the structure of such copolymers so as to generate various desired solution properties of a type intermediate between those exhibited by random and block copolymers. Exemplary of the solution properties which can be altered by this technique are aqueous and non-aqueous solution viscosity, wetting ability, foam stability, cloud point, and surface tension. Additionally, the present invention makes possible the preparation of liquid fluids with properties very similar to the one of block copolymers which are solids or pastes.

Another aspect of this invention relates to the control of the occurrence of primary and secondary hydroxyls in the terminal groups of the copolymers. Generally, the ring-opening addition copolymerization is initiated by any of the well known active hydrogen containing initiators which include alcohols, amines, thiols, carboxylic acids or the corresponding di- or trifunctional initiators and the polymerization can be acid-catalyzed or base-catalyzed. The ring-opened addition copolymer thus produced has one or more terminal hydroxyl groups in accordance with the functionality of the initiator. Since the terminal hydroxyl groups are highly reactive, these copolymers are useful as intermediates in the production of many commercially important classes of compounds including polyesters, polyurethanes, polyacetals, polysiloxanes, polyethers and polycarbonates.

Each terminal hydroxyl group of the ring-opened addition copolymer can be a primary or secondary hydroxyl group, depending on the nature of the mer unit to which the terminal hydroxyl group is bonded. Those skilled in the art will recognize that during the polymerization certain cyclic organic monomers, such as ethylene oxide and tetrahydrofuran, undergo ring-opening addition to the polymer chain in such a way as to form primary hydroxyl terminal groups in most instances (hereafter referred to as "primary hydroxyl forming monomers"), while other cyclic organic monomers undergo ring-opening addition to the polymer chain in such a way as to form secondary hydroxyl terminal groups in most instances (hereafter referred to as "secondary hydroxyl forming monomers"). Thus, for example, a copolymer of ethylene oxide (a primary hydroxyl forming monomer) and propylene oxide (a secondary hydroxyl forming monomer) has primary hydroxyl terminal groups at most of the sites at which the last mer unit added to the polymer chain is an ethylene oxide derived mer unit and secondary hydroxyl terminal groups at most of the sites at which the last mer unit added to the polymer chain is a propylene oxide derived mer unit.

In copolymerizing one or more cyclic organic monomers of the primary hydroxyl forming type (e.g., ethylene oxide) and one or more cyclic organic monomers of the secondary hydroxyl forming type (e.g., propylene oxide) it is highly desirable to be able to control the ratio of primary to secondary hydroxyl terminal groups in the resultant copolymer. Since primary hydroxyl groups are more highly reactive than secondary hydroxyl groups, this ratio affects the rate of reaction of the copolymer with other reactive compounds. While it is frequently desired to maximize the rate of reaction of the copolymer with other reactive compounds for economic reasons, one may also desire to react the copolymer with another compound at a relatively slow controlled rate of reaction. For example, in reacting the ring-opened addition copolymer with an isocyanato compound to produce a polyurethane resin, one may desire a slow reaction rate to increase the pot life of the resin. Moreover, the ratio of primary to secondary hydroxyl terminal groups affects the distribution of reaction products in certain reactions of the copolymer such as, for example the distribution of ketones and aldehydes which are obtained upon oxidation of the terminal hydroxyl groups of the copolymer.

In the prior art, copolymers produced by the ring-opening addition copolymerization of one or more cyclic organic monomers of the primary hydroxyl forming type and one or more cyclic organic monomers of the secondary hydroxyl forming type (hereafter called "mixed hydroxyl end group copolymers") have offered little control over the ratio of primary to secondary hydroxyl terminal groups. Mixed hydroxyl end group copolymers produced by conventional block copolymerization are terminated predominantly by primary hydroxyl groups or predominantly by secondary hydroxyl groups, depending on whether the last monomer fed to the polymerization reactor is of the primary or secondary hydroxyl forming type. Mixed hydroxyl end group copolymers produced by conventional random copolymerization have a ratio of primary to secondary hydroxyl end groups which is substantially fixed for any given ratio of primary to secondary hydroxyl forming monomers in the feed stream. Thus, it can be seen that the ratio of primary to secondary hydroxyl terminal groups in mixed hydroxyl end group copolymers produced by these methods is dependent on the overall structure of the copolymer chain. This is undesirable since it may preclude the skilled worker in the art from producing a mixed hydroxyl end group copolymer having both the optimum ratio of primary to secondary hydroxyl terminal groups and the optimum overall copolymer chain structure for a particular end use. As was previously discussed, the overall monomer sequence distribution in the polymer chain affects important properties such as solution properties, state of aggregation (i.e. solid or liquid) etc.

Heretofore, there have not been available mixed hydroxyl end group copolymers having ratios of primary to secondary hydroxyl terminal groups which can be varied independently of the overall copolymer chain structure.

Certain process techniques disclosed in U.S. Pat. No. 3,804,881, and to some extent disclosed in U.S. Pat. No. 3,839,293, may be employed in the practice of this invention. However, the polymers of this invention are not disclosed in either of these patents. The polymers disclosed and claimed herein are new and possess unexpected beneficial properties not heretofore attained for polymers made from the same monomers. Attention is also drawn to U.S. Pat. Nos. 3,427,287; 3,448,173 and 2,562,235 and British Pat. No. 1,292,226. None of these latter patents disclose the polymers of this invention or techniques for making them. No other more pertinent prior art is known.

BROAD DESCRIPTION OF THE INVENTION

The present invention provides novel polymers of at least two different cyclic organic monomers capable of ring-opening, addition polymerization with themselves and each other. The polymers of this invention comprise polymer chains along with the proportion of mer units provided by a first monomer in one or more given chain lengths (also called "first chain lengths" herein) gradually increases as the proportion of mer units provided by a second monomer along the chain length gradually decreases. Unlike conventional polymers of monomers of this type, the novel polymers have graded sections or chain lengths in their molecules wherein the proportions of mers from the respective monomers gradually shift from one type of mer units to the other type or types of mer units. As a consequence, the polymers of this invention exhibit performance characteristics not heretofore attainable from polymers made from such monomers by conventional procedures.

The monomers to which this invention applies are typically oxirane or 1,2-epoxide monomers, i.e., monomers having an oxirane oxygen bonded to vicinal carbon atoms, such as ethylene oxide and propylene oxide but include other classes of cyclic organic monomers which polymerize with themselves and each other by ring-opening, addition reactions. In addition to those mentioned above, further 1,2-epoxide monomers which can be used in this invention include butylene oxide, styrene oxide, cyclohexene oxide, 1,2-epoxy butadiene, 3-phenoxy-1,2-propylene oxide, glycidyl acrylate, 1,2-epoxy-4,4,4-trichlorobutane, 1,2-epoxy-cyclohexene, 5,6-epoxy-2-norbornene, linseed oil epoxide, and glycidyl methacrylate to mention but a few.

Additional types of cyclic organic monomers other than the epoxides which can be used in the process of this invention include cyclic amides (lactams), cyclic esters (lactones), oxazolidine-2,5-diones, ketene dimers and lactides. Specific examples of such ring systems are caprolactam, 2-pyrollidone and 2-azetidinone as cyclic amides, β-propiolactone, epsilon-caprolactone and valerolactone as cyclic esters, glycine N-carboxyanhydride as an oxazolidine 2,5-dione, the dimer of dimethylketene and lactide itself.

It is recognized that some of these classes of cyclic organic monomers are polymerized with catalyst systems other than the alkali metal hydroxides which are used to catalyze the epoxide systems, such as organometallic reagents, amines, alkali metal hydrides, Lewis acids, metal oxides, and the like. The fact that types of catalysis other than that used herein for the epoxides may be required or preferred for certain classes of monomers is not intended to represent a limitation of this invention. Rather it is to be understood that the present invention is applicable to the preparation both of copolymers derived from monomers of the same basic type or class and to copolymers derived from monomers representing different classes of cyclic organic monomers. For purposes of example, the Lewis acid (e.g., boron trifluoride) catalyzed copolymerization of ethylene oxide with ε-caprolactone to afford a polyether-polyester copolymer is cited as a mixed system to which the power feed process can be applied. It will be obvious to those skilled in the art that the sole limitations on the types of copolymers which may be prepared are that the catalyst system used in mixed class copolymerizations must be one which is active for all types of monomers involved and that the reaction conditions employed must be otherwise compatible with the chemistries of the respective monomers employed.

In one embodiment the present invention provides mixed hydroxyl end group copolymers having a controlled ratio of primary to secondary terminal hydroxyl groups, said ratio being independent of the overall monomer sequence distribution in the copolymer chain. As a consequence, the copolymers of this invention exhibit properties not heretofore attainable in mixed hydroxyl end group copolymers. In this embodiment of the invention at least one of the cyclic organic monomers is one which undergoes ring-opening addition to the polymer chain in such a way as to form a primary hydroxyl terminal group and at least one of the cyclic organic monomers is one which undergoes ring-opening addition to the polymer chain in such a way as to form a secondary hydroxyl terminal group. Typically, the primary hydroxyl forming monomer can be ethylene oxide or tetrahydrofuran and the secondary hydroxyl forming monomer is a 1,2-epoxide other than ethylene oxide, including propylene oxide, butylene oxide, styrene oxide, cyclohexene oxide, 1,2-epoxy-butadiene, 3-phenoxy-1,2-propylene oxide, glycidyl acrylate, 1,2-epoxy-4,4,4-trichlorobutane, 1,2-epoxy-cyclohexene, 5,6-epoxy-2-norbornene, glycidyl methacrylate, epichlorohydrin, cyclohex-3-eny-1,2-epoxyethane, linseed oil epoxide, 1,2-epoxytetradecane and the like.

The process for producing the novel copolymers of this invention includes at least one stage which comprises the steps of introducing at least one primary polymerizable feed composition comprising at least one of the cyclic organic monomers capable of ring-opening, addition polymerization from at least one primary feed source to a polymerization zone, the primary polymerizable feed composition continually varying in compositional content of the polymerizable monomers therein during the continuous introduction; simultaneously adding to the primary feed source at least one different secondary polymerizable feed composition comprising at least one different cyclic organic monomer capable of ring-opening, addition polymerization with itself and the first mentioned monomer, from at least one secondary feed source so as to continually change the compositional content of the polymerizable monomers in the primary polymerizable feed composition in the primary feed source; and continuously polymerizing the primary polymerizable feed composition introduced to the polymerization zone until the desired polymerization has been achieved. In those instances where the respective monomers are of substantially different reactivities or reaction rates it is essential to maintain conditions in the polymerization zone approaching monomer starvation so that the monomer mixture reaching the polymerization zone polymerizes almost instantaneously to provide a composition for the polymer portions which closely resemble the composition of the monomer mixture as fed to the polymerization zone.

It can be readily appreciated that the present invention permits the skilled worker to prepare at will a large number of polymers having different patterns of compositional content along the chains of the polymer molecules. If desired, more than two cyclic organic monomers can be used. In addition, if desired, sections of the novel polymer chains can also include conventional blocks of mers of one or the other of the monomers (e.g., as in conventional block copolymers) by employing known techniques for forming such blocks. Furthermore, the skilled worker has the further option of including sections of random polymerized monomers (e.g., as in conventional random copolymers) by employing known techniques for forming random copolymers.

The terminal portions of the polymer chains of this invention can comprise up to 100% of mer units provided by one of the monomers at both ends or at one end with up to 100% of mer units provided by the other monomer at the other end. The terminal portions at both ends can comprise mixtures of mer units derived from two or more different monomers or the terminal portion at one end can comprise a mixture of mer units of different monomers and at the other end they can comprise up to 100% of mer units provided by the other monomer at the other end. The terminal portions at both ends can comprise mixtures of mer units derived from two or more different monomers or the terminal portion at one end can comprise a mixture of mer units of different monomers and at the other end they can comprise up to 100% of mer units provided by one of the monomers. As pointed out above, the novel polymers can also comprise one or more blocks (also called "second chain lengths" herein) of mer units derived from one monomer. These blocks or second chain lengths can be positioned at the terminal positions of the polymer chains or at intermediate portions thereof.

The novel polymers can also contain in their polymer chains a single given or first chain length as described above, alone or connected to one or more second chain lengths as described above. Alternatively, the polymer chains can contain, connected to the first chain length or second chain length, if any, another chain length (also called "third chain length" hereinafter) which is similar to or the same as the first chain length. That is, in the third chain length the proportion of mer units provided by a first monomer gradually increases as the proportion of mer units provided by a second monomer decreases, or the proportion of mer units provided by the first monomer gradually decreases as the proportion of mer units provided by the second monomer increases. The proportion of mer units provided by the first monomer in the third chain length can gradually increase at the same or different rate as that in the first chain length. The third chain length when the same as, or similar to but different from, the first chain length can be connected to the second chain length. When similar to but different from the first chain length, the third chain length can be connected directly to the first chain length.

When the process of this invention is used to copolymerize primary hydroxyl forming monomers and secondary hydroxyl forming monomers it permits the skilled worker to carefully control the compositional content of mer units derived from primary hydroxyl forming monomers and mer units derived from secondary hydroxyl forming monomers along the entire length of the polymer chain. By controlling the compositional content of mer units at the terminal portion of the polymer chain, the skilled worker thereby controls the ratio of primary to secondary terminal hydroxyl groups. Moreover, by the proper choice of compositional contents and feed rates of the main and auxiliary feed sources, which will be apparent to the skilled worker from the disclosure herein, the ratio of primary to secondary hydroxyl terminal groups can be varied independently of the compositional content of the rest of the polymer chain.

The process of this invention enables the polymerization scientist to control the polymerization process in such manner that he can produce polymers having the desired chemical structures and utilities. The polymers are produced by a process in which the concentrations of the polymerizable cyclic organic monomers in the primary polymerizable feed composition are continually changing during the introduction of the primary polymerizable feed mixture to the polymerization zone by the simultaneous addition of a different secondary polymerizable cyclic organic monomer feed mixture to the primary polymerizable feed mixture. The distinguishing feature of this process is the introduction of primary polymerizable cyclic organic monomer feed mixture to the polymerization zone from a primary feed source while simultaneously introducing at least one different secondary polymerizable cyclic organic monomer feed composition from a secondary feed source to the primary polymerizable feed composition in the primary feed source.

The polymerization zone is any reactor, properly equipped, that can be used for the production of polymers. The different types of reactors and their suitability for a particular polymerization reaction are well known to those skilled in the art and do not require elaboration herein. Connecting to the polymerization reactor is at least one primary feed source. The term "primary feed source" defines one or more tanks or source of polymerizable reactants feeding directly into the polymerization zone or reactor, for example, it can be an in-line mixer or a tank. The primary feed source is equipped with efficient mixing means to assure adequate mixing of the contents thereof. Connecting, in turn, to any of the primary feed sources is at least one secondary feed source. The term "secondary feed source" defines one or more tanks or sources of polymerizable cyclic organic monomers feeding to any of the primary feed sources. There can be one or more secondary feed sources with all of the secondary feed sources feeding directly into the primary feed source, or one or more of the secondary feed sources can feed in series to another secondary feed source and thoroughly mixed therein with finally an ultimate secondary feed source feeding directly into one or more of the primary feed sources. The rate of feed from any one feed source to any other feed source or tank, whether primary or secondary, can be varied at the will of the skilled scientist to meet his desires and objectives. The configurations that can be engineered are many; however, in all instances there must be a polymerization zone or reactor connected to at least one primary feed source or tank equipped with mixing means which in turn is connected to at least one secondary feed source or tank which secondary feed sources (when more than one thereof is used) can all or in part feed directly into one or more of the primary feed source or tank or can feed in series into one another and ultimately feed into the primary feed source or tank.

The primary polymerizable feed composition is the mixture of reactants present at any particular time in the primary feed source or tank. This mixture can contain the polymerizable reactants alone or it can include any additive which will not have a deleterious effect on the polymerizable reactants, for example, diluents or solvents, colorants, dispersion or emulsion agents, antioxidants, stabilizers, chain transfer agents, crosslinkers, initiators, one of the components of a redox catalyst system, and the like. The compositional content of the primary polymerizable feed composition is continually changing as secondary polymerizable feed composition is fed into and mixed with it. By the term compositional content is meant the content or concentration in the polymerizable feed composition of each reactant therein. As becomes apparent from this teaching and description the simultaneous feeding of primary polymerizable feed composition from the primary feed source to the polymerization zone and feeding of a different secondary polymerizable feed composition from the secondary feed source to the primary feed source will result in a continual change of the content or concentration of each reactant present in the primary polymerizable feed composition or in the compositional content of the primary polymerizable feed composition. This continual change in compositional content can also occur in the secondary polymerizable feed compositions when more than one thereof is being used and they are feeding in series into each other before ultimately feeding into the primary polymerizable feed composition.

The secondary polymerizable feed composition is the mixture of reactants present at any particular time in any one or more of the secondary feed sources or tanks and can contain the same types of additives that were previously indicated could be present in the primary polymerizable feed composition. It should be remembered, however, that if one of the polymerizable feed mixtures contains one of the components of a catalyst system that the other such mixture cannot contain the other component thereof, otherwise polymerization will occur in the feed tanks before the polymerizable reactants are introduced into the polymerization zone.

As indicated, in the process of this invention there are used primary polymerizable feed compositions and secondary polymerizable feed compositions. The primary polymerizable feed composition can initially contain a single polymerizable reactant or it can initially contain a plurality of polymerizable reactants; the same is true for the initial content of the secondary polymerizable feed composition. However, when the primary polymerizable feed composition is a single reactant the secondary polymerizable feed composition cannot be solely that same single reactant, it can be a different single reactant or a mixture of a plurality of reactants that can include that same reactant in the mixture. Likewise, when the primary polymerizable feed composition is a mixture of a plurality of reactants the secondary polymerizable feed composition cannot be that same mixture having the same concentrations for each reactant, it can be a single reactant or it can be a different mixture of reactants or it can be a mixture of the same reactants but at different initial concentrations of the reactants. The important and ever present factor is that the initial compositional contents of the primary polymerizable feed composition and of the secondary polymerizable feed composition are always different, they are not initially identical in make-up of polymerizable reactants.

As a result of the initial differences in the composition contents of the primary and secondary polymerizable feed compositions and of the simultaneous addition of secondary polymerizable feed composition to primary polymerizable feed composition while the primary polymerizable feed composition is introduced into the polymerization zone there is a continual variation in the compositional content of the primary polymerizable feed composition. Hence, any portion of the primary polymerizable feed composition entering the polymerization zone is at all times different than the portion that preceded it and the portion that succeeds it. Consequently, the composition of the polymer produced in the reactor during the addition is likewise continuously changing and reflects the composition of the primary polymerizable feed composition entering the polymerization zone. In a rapid polymerization reaction, one wherein there is essentially instantaneous reaction of the monomers when they are introduced to the polymerization zone, one has what is known as a monomer starved system. In other reactions one may have a so-called monomer rich system, i.e., a system in which there is some time delay between introduction of the reactants to the polymerization zone and essentially complete polymerization of the reactants. Thus, in a monomer starved system the polymer produced at any one period of time differs in constitutional content from the polymer produced prior to that period of time or subsequent to that period of time. However, in a monomer rich system the composition of the polymer formed at any instant is dependent upon the concentration of each monomer in the polymerization zone and the respective reactivity of each monomer present therein in relation to the other monomers. There are thus produced certain novel non-uniform polymer compositions of polymer molecules having infinite variation in molecular structures. The instant invention provides a novel process for the production of polymers and certain novel non-uniform polymers themselves. By the term infinite variation in molecular structures is meant the mixture of the infinite number of different polymers that is produced in the polymerization zone by our process. By the term non-uniform is meant that polymer molecules formed at any one time during the polymerization reaction are not the same as polymer molecules formed at any other time.

The process of the invention can be described in its simplest manner by a reaction involving a single different polymerizable reactant. The contents in the primary feed source or tank at any time during the process are known as the primary polymerizable feed composition and the contents of the primary feed source or tank are known as the secondary polymerizable feed composition. Secondary feed source feeds into primary feed source by suitable lines and pumps; primary feed source is equipped with an efficient stirrer or mixer and feeds into the polymerization zone. At the start of the polymerization reaction the flow of primary polymerizable feed composition from primary feed source to the polymerization zone is commenced at a predetermined rate, simultaneously the flow of secondary polymerizable feed composition from secondary feed source to the primary feed source is initiated and this rate of flow can be the same as or different from the rate of flow from the primary feed source to the polymerization zone. As the secondary polymerizable feed composition enters the primary feed source it is thoroughly mixed with the contents thereof resulting in a continual change in the compositional content of the primary polymerizable feed composition. This continually changing primary polymerizable feed composition is simultaneously and continuously entering the polymerization zone and the polymer produced therein is varied in accord with the compositional content of the reactants mixture in the polymerization zone. As is apparent from the prior description either or both of the primary or secondary feed source can contain more than one polymerizable reactant.

The variations in the engineering arrangements of the primary and secondary feed sources are innumerable and no attempt will be made to set forth each specific tank configuration or arrangement possible; these can readily be devised by skilled individuals at will for the purpose of obtaining maximum operational efficiency or for the purpose of obtaining products having certain desired properties. In the preceding paragraph there has been outlined a simple arrangement employing a single primary feed source and a single secondary feed source. Slightly more complex arrangements would be those wherein there was a single primary feed source and a plurality of secondary feed sources; in these instances all of the secondary feed sources could be feeding in parallel directly into the primary feed source or some of the secondary feed sources could be feeding in series to other secondary feed sources with at least one secondary feed source, whether in series or not, ultimately feeding directly into the primary feed source. Other arrangements would be those wherein there were a plurality of primary feed sources; in these instances there could be a single secondary feed source feeding into one or more of the plurality of the primary feed sources, or there could be a plurality of secondary feed sources all feeding in parallel directly into only one of the primary feed sources, or a plurality of secondary feed sources directly feeding into more than one primary feed source or all of the plurality of secondary feed sources could be feeding in series into only one of the primary feed sources, or the plurality of secondary feed sources can be feeding in series into more than one of the primary feed sources. When a plurality of secondary feed sources is used they can be used in any combination desired, all can be used in series, some can be used in series while others are not, or none need be used in series with all of them being added directly to the primary feed source. In all instances the primary feed sources feed the primary polymerizable feed composition to the polymerization zone; the secondary feed sources feed the secondary polymerizable feed composition directly to the primary feed source or in series to another secondary feed source with the reactants herein ultimately terminating in the primary feed source before entering the polymerization zone. During these movements of reactants from one feed source to another there is a resultant continual change in the compositional content of the contents of the tank to which polymerizable reactant is added and the contents of the tanks are agitated to obtain efficient mixing of the contents therein. One can also vary the process by having periods of time at the start, during or near the end of the reaction wherein there is feeding of primary polymerizable feed composition from the primary feed source into the polymerization reactor without any simultaneous feeding of secondary polymerization feed composition into the primary feed source or tank for a selected period of time. In addition, the flow rates between feed tanks or polymerization zone can be varied at will at any time during the polymerization reaction. One can also, with suitable known means, using variable feed valves, feed polymerizable reactants from a plurality of secondary feed sources through an in-line mixer which serves as the primary feed source wherein the primary polymerizable feed composition is produced. The in-line mixer then feeds the primary polymerizable feed composition directly into the polymerization zone.

In the process of this invention non-uniform polymers are produced in a controlled manner. By the term non-uniform polymer is meant a polymer composition produced by the reaction of a polymerizable reactants mixture which during a portion of the polymerization period is continually changing in compositional content. The polymers produced by this process can have unexpected properties and/or performance characteristics compared to similar polymers produced by the conventional processes used in the past. In addition, it was found that one can design polymrs having the desired properties and performance characteristics. It was further found that polymers having satisfactory and desirable properties can be produced from mixtures of polymerizable reactants that in the past could not be used to obtain satisfactory polymers. The process also enables one to unite basically incompatible monomers for the production of useable polymers by virtue of the continuous change in composition of the polymer being produced during the polymerization reaction.

The incorporation of functional groups on the surface of the polymer particles, for example for external cross-linking or adhesion promotion, can also be controlled by gradually and continually increasing the concentration of reactants containing such groups in the primary polymerizable feed composition towards the end of the polymerization reaction.

The process of this invention can be used to polymerize any mixture of polymerizable cyclic organic monomers or reactants that will co-react or copolymerize with each other at a rate such that there is no substantial build-up of any one monomer or reactant or group of monomers or reactants while the other monomers or reactants are reacting and forming polymer. The invention is not restricted to any limited group or class of polymerizable cyclic organic monomers or reactants, the process is broad in its application and use.

The concentrations of a particular polymerizable reactant initially present in the primary polymerizable feed composition or initially present in the secondary polymerizable feed composition can vary from 0.01 weight percent to 100 weight percent based on the total weight of polymerizable reactants initially present in the particular feed stream. These concentrations can be varied at the will of the skilled individual, as is recognized in the art, to obtain the particular final concentrations of each reactant in the polymer or to obtain a particular property or characteristic in the polymer. The rate of flow from secondary feed sources and from primary feed sources can also be varied at the will of the skilled individual and do not require elaborate discussion herein. The process employs the temperature and pressure conditions known suitable for the reactants employed. As a consequence of the control over monomer sequence distribution provided by this invention, the resulting polymers exhibit performance characteristics not heretofore attainable from the same monomers.

One important advantage of this invention is that it allows the production of polyoxyethylenepolyoxypropylene copolymers having any of an unlimited number of combinations of chain structures and ratios of primary to secondary hydroxyl terminal groups. For example, one can have a polymer in which the major portion of the polymer chain consists of alternating blocks of mer units derived from ethylene oxide and mer units derived from propylene oxide and the terminal portion contains 50% primary hydroxyl groups and 50% secondary hydroxyl groups. One can also have a polymer in which the major portion of the polymer chain consists of a uniformly random structure having 80% mer units derived from propylene oxide and 20% mer units derived from ethylene oxide and the terminal portion contains 95% primary hydroxyl groups and 5% secondary hydroxyl groups. One can also have a polymer in which the major portion of the chain length is a random arrangement of mer units derived from ethylene oxide and mer units derived from propylene oxide, in which the ratio of the two types of mer units varies continuously along the chain length as desired, and the terminal portion contains any desired ratio of primary hydroxyl groups to secondary hydroxyl groups. Alternatively, one can have a polymer in which the major portion of the polymer chain contains a series of segments, each of which can have any of the aforementioned block or random mer unit arrangements, the segments being arranged in any desired order, and the terminal portion contains any desired ratio of primary hydroxyl groups to secondary hydroxyl groups. The above examples are intended to be only illustrative of the unlimited number of obtainable structures and are not meant to limit the scope of the invention.

DESCRIPTION OF PREFERRED EMBODIMENTS

Figure 1:
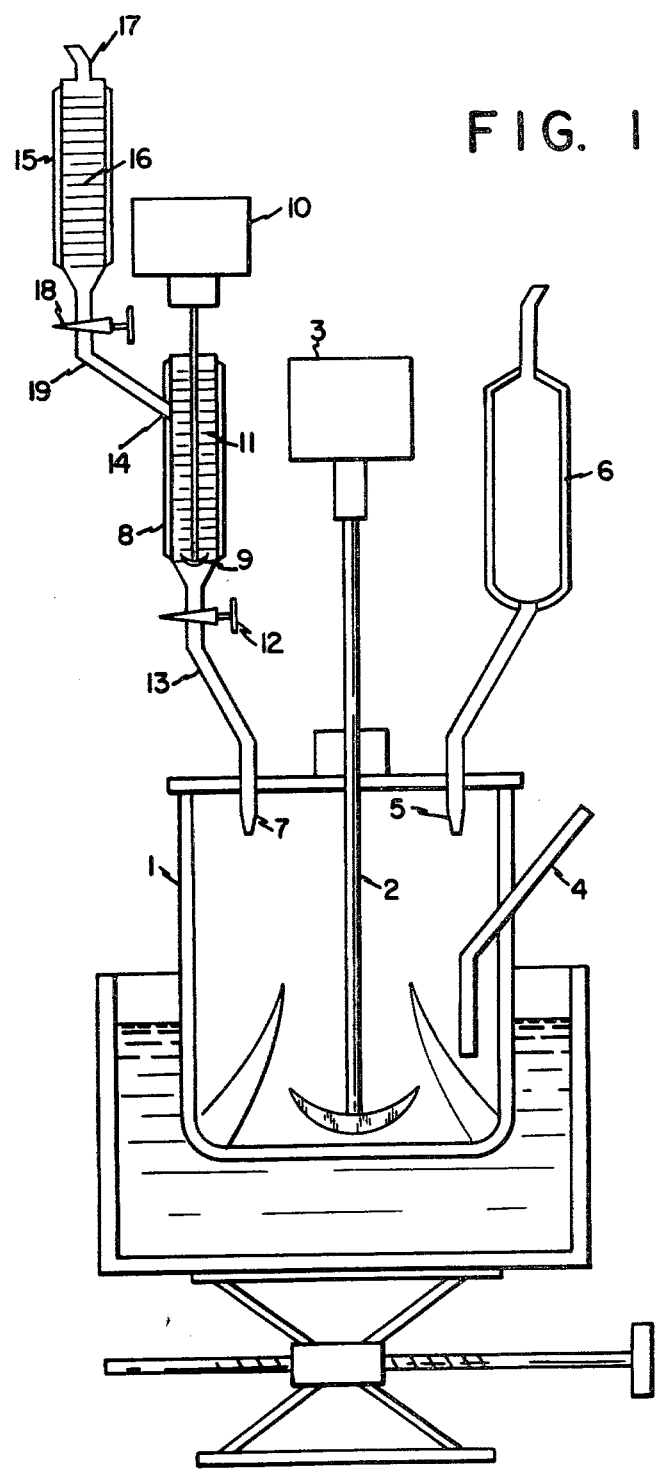
FIG. 1 is a schematic diagram illustrating apparatus that can be used to carry out this invention.

Among the preferred polymers, of this invention, are the polyoxyethylene-polyoxypropylene copolymers prepared according to this invention. That is, the preferred polymers comprise polymer chains along which the proportion of oxypropylene units in a given chain length gradually increases (or decreases) as the proportion of oxyethylene units gradually decreases (or increases).

A preferred process for preparing ethylene oxide-propylene oxide copolymers of the present invention differs from processes employing conventional block or random free techniques, primarily in the manner in which the comonomer feed stocks are introduced into the polymerization zone. This difference, of course, represents the essence of the process of the present invention. Another important difference, which often arises as a requirement of the process of this invention lies in operating under conditions approaching monomer starvation in the reaction system. The latter difference is an important one in ethylene oxide - propylene oxide copolymerizations because these two monomers are quite different in terms of their quite different reactivities. Ethylene oxide reacts faster than propylene oxide under the conditions of a base-catalyzed alkoxylation. Additionally, the ethylene oxide addition generates a primary hydroxyl group on the polymer chain as opposed to predominantly a secondary hydroxyl group with 1,2-propylene oxide addition. Since the primary hydroxyls are more reactive than the secondaries, there is an inherent tendency for lengthy sequences of ethyleneoxy units to form in such copolymerizations. However, by operating at atmospheric pressure to ensure a low concentration of unreacted oxides in the liquid phase and feeding monomers at a rate such that they are consumed as rapidly as they are fed, the problem of unequal reactivities of the two oxides can be largely overcome. In conducting the copolymerizations given in the Examples hereinafter presented, conditions approaching monomer starvation were established and maintained by ensuring that the visually monitored reflux rate of unreacted oxide monomers did not exceed one drop per every 15 drops of monomer feedstock introduced.

Otherwise, the process of this invention for making the novel copolymers is no different from conventional processes using random or sequential feeds. For example, a preferred process for making polyoxyethylene-polyoxypropylene copolymers comprises feeding the appropriate quantities of the monomers to a kettle charge containing a starter and some base catalyst, usually the potassium alcolate derivative of the starter. The starters are known to those skilled in the art and can be monofunctional or polyfunctional. Since these compounds are well illustrated in the prior art, they require no further elaboration to enable one skilled in the art to comprehend which compounds are intended. Any of the known starters can be used. They include alcohols, polyols, primary or secondary amines, hydroxyl amines and carboxylic acid compounds; water can also be used as a starter. The amount of starter charge is dictated by the molecular weight desired and the quantity of monomer to be fed; for example, a charge of one mole of a starter of molecular weight x with 2000 grams of the oxide monomers should give a theoretical number average molecular weight of 2000+x. As a general rule the actual molecular weight achieved is somewhat below theory because side reactions, traces of moisture in the feed, and/or other factors tend to depress the molecular weight. A typical catalyst charge is 0.1–0.5% by weight (such as potassium hydroxide) based upon the final weight of product expected. The catalyst solution can be prepared from the starter alcohol either by direct reaction with metallic potassium or potassium hydroxide, or by an exchange reaction with some other potassium alcoholate. If KOH is used, the water generated in the catalyst preparation should be removed by some means such as azeotropic distillation, for example, prior to the addition of any oxide monomer feeds. In the case of starter preparation by an alcoholate exchange reaction, the lower boiling alcohol released from the added alcoholate by exchange should be removed, by distillation, for example, prior to the addition of oxide monomer feeds. Other alkali metals or their derivatives such as sodium, sodium hydroxide or a sodium alcoholate can be employed as polymerization catalysts also, but the potassium species are preferred.

The usual polymerization temperature for ethylene oxide - propylene oxide copolymerization of this type is about 100°–125° C. with the preferred range being about 100°–110° C. In general, the temperature used should be the minimum temperature consistent with an acceptable reaction rate because higher temperatures promote side reactions or isomerizations which generate unsaturated species. The polymerization should be conducted in the presence of nitrogen or some other inert gas to repress oxidation reactions leading to poor color. Atmospheric or superatmospheric pressures may be employed, but for purposes of the present invention pressures nearer atmospheric are preferred in order to prevent an appreciable build-up of unreacted oxide monomers in the liquid phase. Upon completion of the oxide monomer addition, standard procedure is used to cook out the charge for a short period of time prior to neutralization, filtration and stripping. The neutralization can be conducted with various mineral or organic acids, or alternatively with certain diatomaceous earths, such as the commercial "Magnesol" product. Other procedures such as ion-exchanging are also acceptable. Following neutralization, which is preferably carried out at 100°–110° C., the charge is filtered to remove salts of neutralization and held for a short period of time under reduced pressure so as to free it of any residual monomers or other volatiles.

It must be emphasized that this invention is not limited to any particular techniques of operation or workup. Each manufacturer has certain procedures and/or techniques which he prefers and which may be unique to his situation. The process described hereinabove is for purposes of illustration; the utility of the process of this invention is not limited in scope to any specific set of conditions or procedures.

Suitable apparatus for carrying out the present invention is shown in FIG. 1. Other apparatus can be used. The apparatus shown in FIG. 1 was used in carrying out the examples presented hereinafter.

The apparatus of FIG. 1 includes a polymerization vessel or reactor 1 equipped with a stirrer 2 driven by a motor 3 and a thermocouple 4 for monitoring the temperature of polymerization. The polymerization vessel 1 is closed and is fitted with a vent 5 connected to a dry ice condenser 6 which is connected to cold traps (not shown). The polymerization vessel 1 is also fitted with an inlet 7 connected to a primary feed source 8 also called feed tank I hereinafter. Feed tank I or primary feed source 8 is equipped with a stirrer 9, a motor 10 and brine cooling means 11. A valve 12 is located in the line 13 leading from the primary feed source 8 to the polymerization vessel 1 for controlling the rate of flow of primary polymerizable feed composition from source 8 to vessel 1. The primary feed source 8 is also provided with an inlet 14 which is connected to a secondary feed source 15, also called feed tank II hereinafter, which contains brine cooling means 16 and a nitrogen inlet 17. A valve 18 is located in line 19 leading from secondary feed source 15 to primary feed source 8 for controlling the rate of flow of secondary polymerizable feed composition from secondary feed source 15 to primary feed source 8.

The arrangement depicted in FIG. 1 is one of the simpler arrangements out of the many possible multiple feed tank possibilities inherent in the present invention. One feature which is preferably common to all configurations is that of a mixing capability in the primary feed tank 8 which ultimately feeds directly the polymerization reactor 1.

The process of this invention can be regarded as a multi-stage process having an infinite number of stages. Implicit in its use in the production of polymers from monomers having divergent rates of polymerization (e.g. ethylene oxide and propylene oxide) is the fulfillment of the requirement that the polymerization be conducted under conditions approaching monomer starvation, i.e., conditions which ensure that conversion of monomer feed to polymer proceeds at a rate equal to or exceeding the rate at which the monomers are introduced into the reaction zone 1. Thus, the composition of the copolymer formed at any given instant must then necessarily differ slightly from that formed just prior to or just subsequent to it in points of time.

An infinite variety of monomer feed profiles are possible through application of this invention to a given copolymer system. Providing that conditions approaching monomer starvation prevail in the reaction system in the usual case, each combination of conditions will generate a copolymer whose structure will be unique to the particular feed profile employed. If the specific monomers comprising the copolymer are ones whose respective homopolymers are basically dissimilar in properties, copolymers generated by different feed profiles can be expected to exhibit differences in their performance characteristics.

EXAMPLES

The following examples are presented. Unless otherwise stated, all parts and percentages are on a weight basis and all temperatures are on the Centigrade scale. Examples A, B and C given below do not illustrate the present invention but are presented for comparison purposes.

The evaluation tests performed in providing the data in the following examples to characterize the products of this invention analytically and functionally are summarized below:

A. Analytical Characterization

1. Molecular Weights—Number average molecular weights are obtained by a wet chemical method wherein the hydroxyl content is determined through reaction with phthalic anhydride in pyridine solution followed by titration of the excess anhydride with a standard solution of sodium hydroxide.
2. Gross Compositions—The overall compositions were obtained by nuclear magnetic resonance spectroscopy in deuterochloroform solvent. The area of the propylene oxide methyl group protons at 1.15 ppm is subtracted from the total area of all methylene and methine protons in the region of 3.2–3.9 ppm. The difference represents the contribution due to ethylene oxide.
3. Glass Transition Temperatures—The glass transition temperatures (Tg) were determined by plotting torsion pendulum-generated loss modulus data against temperature.
4. Monomer Sequence Average Lenghts—These were obtained by nuclear magnetic resonance spectroscopy in carbon disulfide solvent using tris(divaloyl-methanato) europium as the shift reagent. Sequence lengths were calculated from knowledge of triad distribution and gross composition data.

B. Bulk Fluid Properties

1. Viscosity/temperature Relationships—These data were obtained by Ubbelohde viscometric measurements at temperatures of 70°, 100°, 130° and 210° F.
2. Specific Gravity/Temperature Relationships—These data were obtained by pyknometer measurements at 70°, 130° and 210° F.
3. Surface Tensions—These values were obtained by the De Nuoy Ring Tensiometer method with the measured 70° F. specific gravity being used for the calculation correction along with the ring calibration value (0.896) supplied by the instrument manufacturer.

C. Solution Properties

1. Aqueous Solution Viscosities—These data were obtained by incrementally adding water to 100 g of the fluid, stirring with a Mag-mix for 5 minutes, and measuring the viscosity with a Brookfield Synchro-Lectric Viscometer, Model RVF.
2. Heptane Solution Viscosities—Same procedure as C.1. above using heptane in place of water.
3. Foaming and Foam Stabilities—These data were obtained by agitating a 0.1% by weight aqueous solution of the fluid for 30 seconds in a calibrated Waring Blender, recording the initial foam height, and then recording the times at which the liquid level generated by drainage of the foam reached the 100, 125, 150, 175, 200 and 225 ml. markings on the calibrated Blender.
4. Wetting characteristics—Wetting characteristics were determined by the Draves Method (see American Dyestuff Reporter 20, 201 (1931). In this method the time required for a standard cotton skein attached to a standard lead weight by a standard copper hook to sink in a 500 ml. graduate containing a 0.1% aqueous solution of the fluid is measured; the value reported in all Tables is the average of 3 determinations.
5. Surface Tensions at Critical Micelle Concentrations—These values were obtained by the graphic intercept method off a semi-log plot of De Nouy Ring Tensiometer values as a function of solution concentration over the range from 0.1 to 0.0003125%.
6. Cloud Points—The cloud point values were obtained by heating 40 ml. of a 1% aqueous solution of fluid contained in a large test tube in a water bath. The solution was stirred manually with a thermometer and the cloud point was taken at the temperature at which the bulb of the thermometer was essentially invisible due to clouding.

EXAMPLES 1-4, A and B

Figure 2:
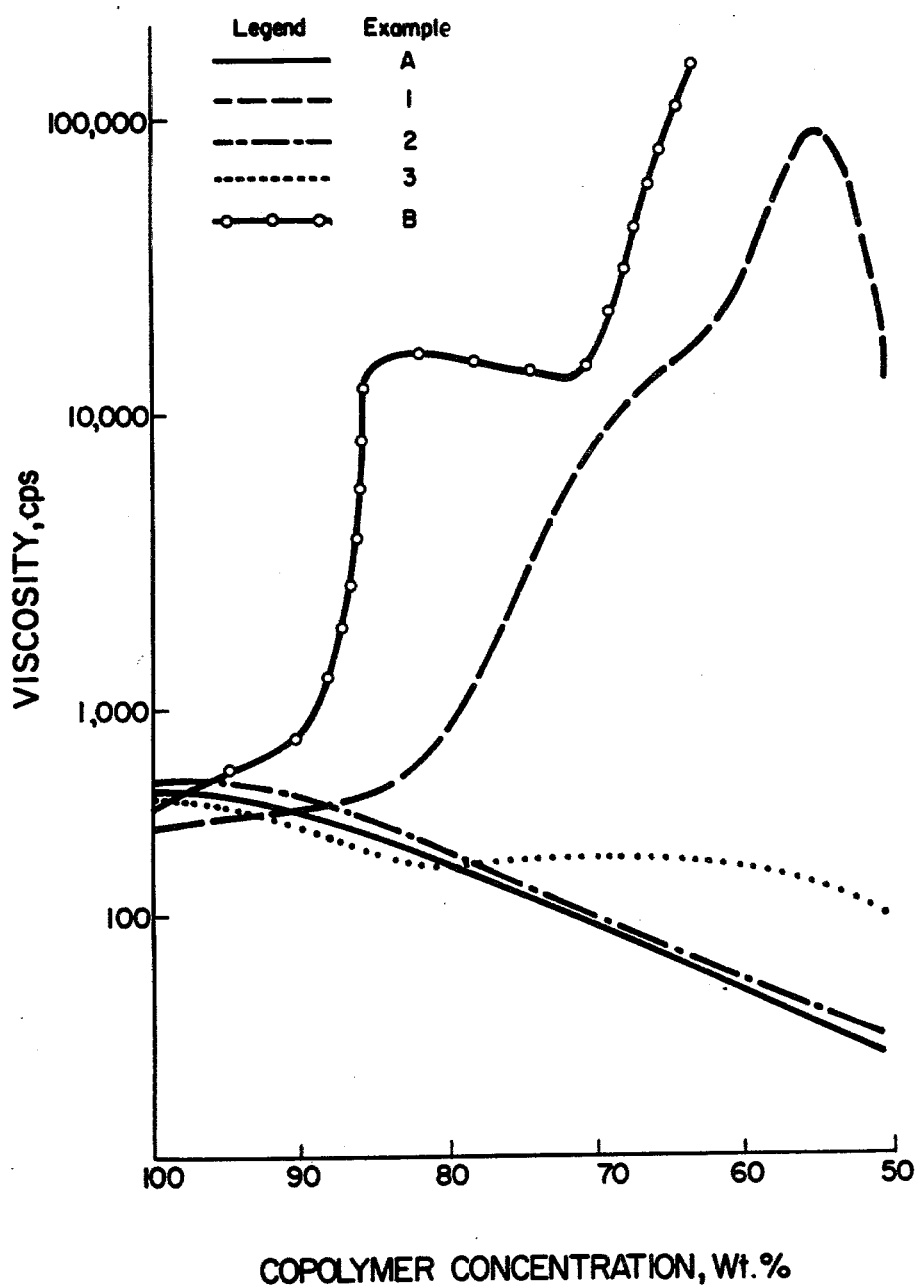
FIG. 2 is a graph plotting viscosities in centipoises at 25° C. of aqueous solutions of the copolymers produced in Examples 1, 2, 3, A and B described hereinafter versus the copolymer concentrations in weight percent.
Figure 3:
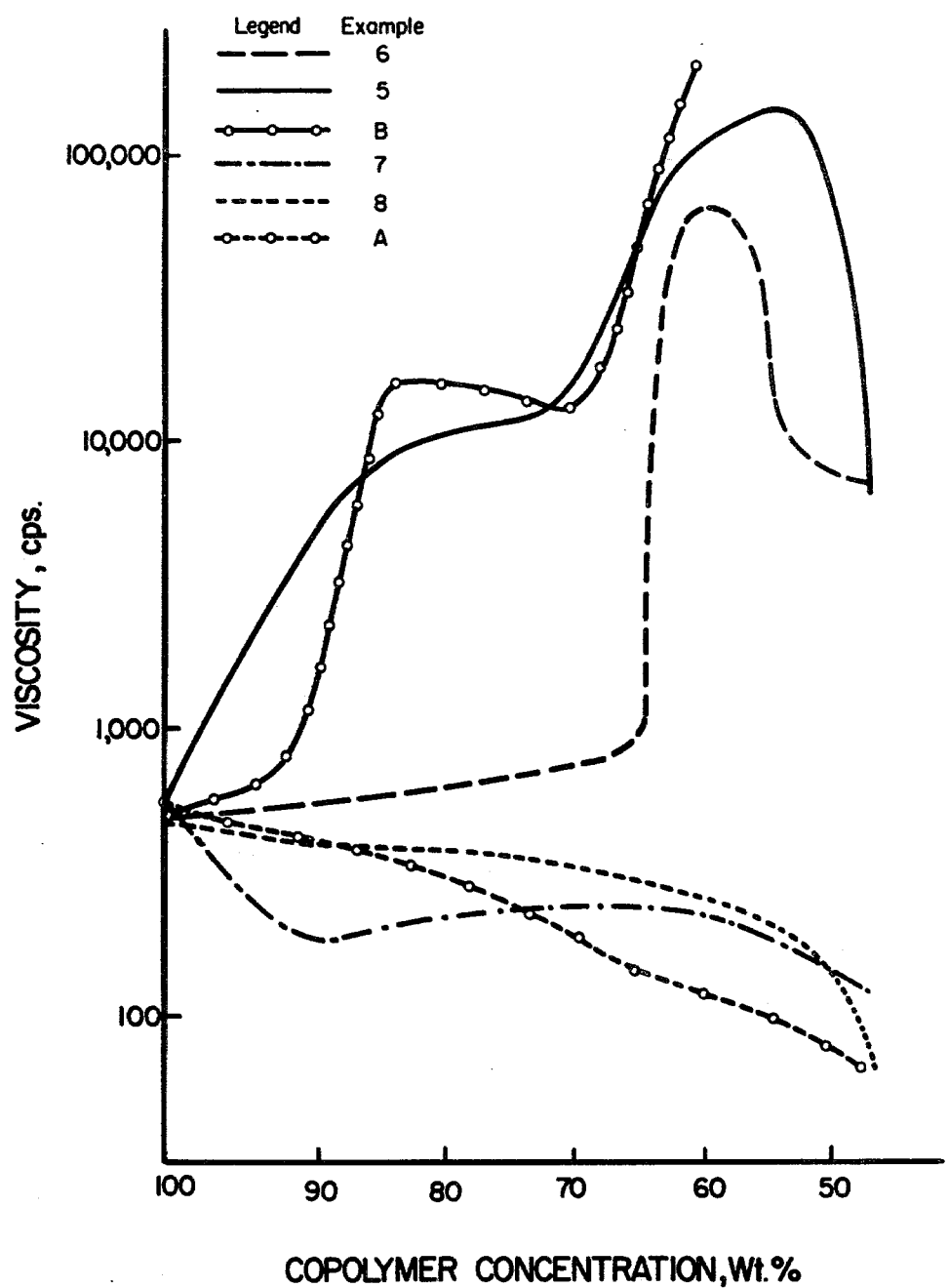
FIG. 3 is a graph plotting viscosities in centipoises at 25° C. of aqueous solutions of the copolymers of Examples 5, 6, 7, 8 A and B described hereinafter versus the copolymer concentrations in weight percent.

Examples 1-4 describe a group of butanol-started fluids prepared under various single-stage, simple feed conditions as given in Table 1. These copolymers are all of 50/50 w/w % nominal composition. For comparative purposes, Examples A and B illustrate control fluids made under conventional block and random feed conditions. Table 1 summarizes the reactor charges, feed tank charges and feed rates used to prepare these fluids; Table 1 contains evaluation data and FIG. 2 shows a plot of aqueous solution viscosity characteristics.

The results summarized in Table 2 reveal the similarity of these fluids in terms of most bulk properties, but not in solution properties. Their aqueous and organic solution viscosity behavior, their aqueous solution foaming, wetting and surface tension characteristics, and their cloud point temperatures all indicate that these fluids are structurally different from one another despite their comparable overall compositions. The NMR monomer sequence length data, where determined, confirms these structural differences.

A comparison of the bulk appearances and performances characteristics of Example 1 with the block and random feed controls Examples A and B points up one obvious advantage of power feed. The product of Example 1, although generally similar to the block feed control (Example B) in solution properties, is a liquid at room temperature whereas the block feed control product (Example B) is a solid. The random feed control product (Example A) while also a liquid, does not have the surface activity characteristics of the product of Examples 1–4. This clearly demonstrates that the present invention generates copolymers structurally of a type intermediate between random and block products, combining certain desirable features of both.

TABLE 1

| Example: | A | 1 | 2 | 3 | 4 | B |
|---|---|---|---|---|---|---|
| Feed Type: | Random | 1-Stage Linear | 1-Stage Linear | 1-Stage Skewed | 1-Stage Skewed | Blocked |
| Reactant Charges, g. | | | | | | |
| Polymerization Reactor | | | | | | |
| n-Butanol | 18.5 | 18.5 | 18.5 | 18.5 | 18.5 | 18.5 |
| Potassium Metal | 2.79 | 2.79 | 2.79 | 2.79 | 2.79 | 2.79 |
| Feed Tank I (Stirred) | | | | | | |
| Ethylene Oxide | 375 | 0 | 375 | 0 | 94 | 0 |
| Propylene Oxide | 375 | 375 | 0 | 250 | 375 | 375$^a$ |
| Feed Tank II (Unstirred) | | | | | | |
| Ethylene Oxide | — | 375 | 0 | 375 | 281 | 375$^a$ |
| Propylene Oxide | — | 0 | 375 | 125 | 0 | 0 |
| Feed Rates, ml/hr. | | | | | | |
| Feed Tank I | 60 | 60 | 60 | 60 | 60 | 60$^a$ |
| Feed Tank II | — | 28.3 | 31.1 | 40.1 | 21.6 | 60$^a$ |

$^a$Sequential addition of the two individual monomers; Propylene oxide followed by Ethylene oxide.

TABLE 2

| Example: | A | 1 | 2 | 3 | 4 | B |
|---|---|---|---|---|---|---|
| Molecular Weight (Mn) | 2656 | 2615 | 2335 | 2353 | 2575 | 1840 |
| Composition, Weight % | | | | | | |
| Ethylene Oxide | 51.7 | 49.2 | 52.0 | 50.6 | 50.6 | 49.5 |
| Propylene Oxide | 48.3 | 50.8 | 48.0 | 49.4 | 49.4 | 50.5 |
| Average Sequence Length | | | | | | |
| Ethylene Oxide | 2.42 | 7.40 | 4.16 | — | — | — |
| Propylene Oxide | 1.55 | 5.55 | 2.67 | — | — | — |
| Glass Transition Temp., °C. | −68 | −66 | −62 | −66 | −64 | −65 |
| Appearance at °F.* | | | | | | |
| 32 | c | c | SH | c | c | s |
| 70 | c | c | c | c | c | s |
| Viscosity at °F., cks. | | | | | | |
| 70 | 585 | 566 | 539 | 507 | 529 | solid |
| 100 | 269 | 249 | 242 | 227 | 237 | 252 |
| 130 | 143 | 132 | 131 | 123 | 128 | 124 |
| 210 | 47 | 45 | 42 | 39 | 41 | 39 |
| Sp. Gravity, g/cc, at °F. | | | | | | |
| 70 | 1.0515 | 1.0507 | 1.0509 | 1.0487 | 1.0495 | solid |
| 130 | 1.0255 | 1.0243 | 1.0250 | 1.0232 | 1.0238 | 1.0278 |
| 210 | 0.9918 | 0.9906 | 0.9906 | 0.9892 | 0.9896 | 0.9936 |
| Surface Tension, Dynes cm$^{-1}$ | 33.8 | 32.41 | 34.18 | 33.92 | 33.51 | solid |
| 25° C. Aq. Sol. Vis., cps. (Appearance) at % Fluid | | | | | | |
| 100 | 530(c) | 390(c) | 570(c) | 510(c) | 420(c) | |
| 83.3 | 350(c) | 545(GP) | 370(c) | 300(c) | 325(c) | SEE |
| 71.4 | 200(c) | 6,300(G) | 225(c) | 315(c) | 225(c) | TABLE |
| 62.4 | 120(c) | 17,000(G) | 144(c) | 290(c) | 150(c) | 4 |
| 55.5 | 90(SH) | 90,000(FP) | 96(c) | 260(c) | 100(c) | |
| 50.0 | 62(SH) | 12,000(FP) | 72(c) | 200(c) | 60(c) | |
| 50.0 at 5° C. | 250(c) | 2,600(c) | 300(c) | 320(c) | 150(c) | solid |
| 50.0 at 45° C. | 45(c) | 78,000 (FP) | 65(c) | 160(c) | 55(c) | solid |
| 25° C. Heptane Sol. Vis., cps. (Appearance) at % Fluid | | | | | | |
| 100 | 530(c) | 390(c) | 570(c) | 510(c) | 420(c) | |
| 88.0 | 152(c) | 180(c) | 355(H) | 110(c) | 150(c) | SEE |
| 78.6 | 72(c) | 80(c) | 306(PS) | 58(c) | 40(c) | TABLE |
| 71.0 | 52(H) | 36(H) | 270(PA) | 38(c) | 60(PS) | 4 |
| 64.7 | 54(PS) | 68(PS) | 258(PS) | 36(c) | 52(PS) | |
| 59.5 | 52(PS) | 76(PS) | 200(PS) | 42(PS) | 48(PS) | |
| Cloud Point, °C., 1% | 54 | 60 | 53 | 59 | 53 | 73 |

TABLE 2-continued

| Example: | A | 1 | 2 | 3 | 4 | B |
|---|---|---|---|---|---|---|
| Wetting Time, sec. | >600 | 132 | >600 | 221 | 134 | 39 |
| Foaming and Foam Stability | | | | | | |
| Foam Height, cc | 600 | 700 | 550 | 600 | 550 | |
| Time, sec., to Drain Water to Height of, cc. | | | | | | |
| 100 | 5 | 75 | 13 | 70 | 60 | 60 |
| 125 | 10 | 83 | 19 | 87 | 70 | 68 |
| 150 | 12 | 97 | 23 | 93 | 80 | 78 |
| 175 | 15 | 125 | 27 | 99 | 88 | 88 |
| 200 | 20 | 190 | 35 | 163 | 136 | 142 |
| 225 | 34 | 550 | 48 | 235 | 265 | 375 |
| Surface Tension, Dynes cm$^{-1}$ at Critical Micelle Conc. | 59.2 | 53.5 | 58.8 | 58.5 | 50.7 | 45.7 |

*Appearance Code: c = clear;
SH = slightly hazy;
VH = very hazy;
FP = frothy paste;
GP = gel particles;
G = gel;
PS = phase separation; S = solid; P = S paste

EXAMPLES 5–8

These examples describe a group of butanol-started fluids prepared under two-stage power feed conditions. These copolymers are all of 50/50 w/w % nominal composition. Table 3 gives pertinent data on reactor charges, feed tank charges and feed rates while Table 4 covers evaluation results and FIG. 2 shows a plot of aqueous solution viscosity characteristics. For purposes of comparison, the group again includes control samples Examples A and B representing conventional block and random feed preparations.

The results in Table 4 demonstrate clearly that the performance characteristics of polyether copolymers can be tailored conveniently by the present invention. The aqueous solution viscosity behavior, for example, can be altered all the way from a water-gelling liquid to one which decreases continually in viscosity upon dilution. In between these extremes lie fluids whose viscosity profiles upon water dilution are rather flat or even proceed through maxima without reaching a gel condition. These fluids can be readily made by the power feed process. Accompanying these changes are the indicated changes in other solution properties such as wetting, foaming, surface tension and tolerance for organic liquids such as hydrocarbons.

TABLE 3

| Example: | 5 | 6 | 7 | 8 |
|---|---|---|---|---|
| Feed Type: | 2-Stage | 2-Stage | 2-Stage | 2-Stage |
| Reactant Charges, g. | | | | |
| Polymerization Reactor | | | | |
| n-Butaol | 18.5 | 18.5 | 18.5 | 18.5 |
| Potassium | 2.79 | 2.79 | 2.79 | .79 |
| Feed Tanks, Stage 1$^a$ | | | | |
| Tank I (stirred) | | | | |
| Ethylene oxide | 0 | 23.5 | 29.3 | 35.15 |
| Proylene oxide | 234.4 | 211 | 205.2 | 199.35 |
| Tank II (unstirred) | | | | |
| Ethylene oxide | 70.3 | 70.3 | 70.3 | 70.3 |
| Propylene oxide | 70.3 | 70.3 | 70.3 | 70.3 |
| Feed Tanks, Stage 2$^a$ | | | | |
| Tank I (stirred) | | | | |
| Ethylene oxide | 70.3 | 70.3 | 70.3 | 70.3 |
| Propylene oxide | 70.3 | 70.3 | 70.3 | 70.3 |
| Tank II (unstirred) | | | | |
| Ethylene oxide | 234.4 | 211 | 205.2 | 199.35 |
| Propylene oxide | 0 | 23.5 | 29.3 | 35.15 |
| Feed Rates, ml/hour | | | | |
| Stage 1 | | | | |
| Tank I (stirred) | 60 | 60 | 60 | 60 |
| Tank II (unstirred) | 22.0 | 22.1 | 22.1 | 22.1 |
| Stage 2 | | | | |
| Tank I (stirred) | 60 | 60 | 60 | |
| Tank II (unstirred) | 37 | 37 | 37.1 | 37.6 |

$^a$Simultaneous addition during both stages; tanks recharged between stages.

TABLE 4

| EXAMPLE: | A | 5 | 6 | 7 | 8 | B |
|---|---|---|---|---|---|---|
| Molecular Weight (Mn) | 2656 | 2292 | 2365 | 2377 | 2115 | 1840 |
| Composition, Weight, % | | | | | | |
| Ethylene Oxide | 51.7 | 47.9 | 47.5 | 46.9 | 49.3 | 49.6 |
| Propylene Oxide | 48.3 | 49.5 | 50.0 | 50.6 | 48.1 | 47.9 |
| n-Butanol | not determined | 2.6 | 2.5 | 2.5 | 2.5 | 2.5 |
| Average Sequence Length | | | | | | |
| Ethylene Oxide | 2.42 | 5.30 | .88 | 2.39 | 2.54 | — |
| Propylene Oxide | 1.55 | 3.36 | 2.53 | 1.65 | 1.62 | — |
| Glass Transition Temp., °C. | −68 | −63 | −66 | −65 | −65 | −65 |
| Appearance at 70° C.* | c | H | c | c | c | wax |
| Viscosity, cks, at °F. | | | | | | |
| 70 | 585 | 625 | 585 | 645 | 572.5 | solid |
| 100 | 269 | 267 | 256 | 281 | 250 | 242 |
| 130 | 143 | 137 | 135.5 | 147 | 130 | 124 |
| 210 | 47 | 41.7 | 41.8 | 45.4 | 42.8 | 38.8 |
| Specific Gravity, g/cc at °F. | | | | | | |

TABLE 4-continued

| EXAMPLE: | A | 5 | 6 | 7 | 8 | B |
|---|---|---|---|---|---|---|
| 70 | 1.0515 | 1.0545 | 1.0523 | 1.0521 | 1.0529 | solid |
| 130 | 1.0255 | 1.0285 | 1.0268 | 1.0259 | 1.0273 | 1.0278 |
| 210 | 0.9918 | 0.9940 | 0.9922 | 0.9916 | 0.9928 | 0.9936 |
| Surface Tension, Dynes $Cm^{-1}$ | 33.8 | 32.03 | 32.77 | 32.95 | 33.11 | — |
| 25° C. Aq. Sol. Vis., Cps Appearance)* At % Fluid | | | | | | |
| 100 | 530(c) | 528(c) | 488(c) | 560(c) | 470(c) | solid |
| 90.9 | — | — | — | 188(c) | 392(c) | 750(c) |
| 83.3 | 350(c) | 9,500(c) | 580(c) | 212(c) | 384(c) | 16,000(GP) |
| 76.9 | — | — | 675(c) | 222(c) | 360(c) | 15,000(GP) |
| 71.4 | 200(c) | 14,400(FP) | 725(c) | 228(c) | 314(c) | 13,000(GP) |
| 66.7 | — | — | 850(c) | 228(c) | — | 47,000(GP) |
| 62.5 | 120(c) | 100,000 (FP) | 64,000 (FP) | 222(c) | 260(c) | >200,000(G) |
| 58.8 | — | — | 48,000 (FP) | 202(c) | — | >200,000(G) |
| 55.5 | 90(SH) | 140,000(GP) | 8,900(FP) | 168(c) | 180(c) | >200,000(G) |
| 52.6 | — | — | 7,900(FP) | 134(c) | — | >200,000(G) |
| 50.0 | 62(SH) | 5,700(FP) | 6,700(FP) | 116(c) | 64(c) | >200,000(G) |
| 50.0 at 5° C. | 250(c) | 640(c) | 355(c) | 275(c) | 285(c) | |
| 50.0 at 45° C. | 45(c) | 88,000(G) | 8,800(FP) | 800(GP) | 130(c) | |
| 25° C. Heptane Sol. Vis., cps (Appearance)* At % Fluid | | | | | | |
| 100 | 530 | 528(c) | 488(c) | 560(c) | 470(c) | solid |
| 88.0 | 152(c) | — | — | — | — | — |
| 83.3 | — | 105(c) | 100(c) | 110(H) | 96(PS) | 250(c) |
| 78.6 | 72(c) | — | — | — | — | — |
| 71.4 | — | 40(c) | 50(H) | 45(H) | 52(PS) | 180(H) |
| 71.0 | 52(H) | — | — | — | — | — |
| 64.7 | 54(PS) | — | — | — | — | 95(PS) |
| 62.5 | — | 38(c) | 42(H) | 45(PS) | 46(PS) | — |
| 59.5 | 52(PS) | — | — | — | — | 78(PS) |
| 55.0 | — | 24(c) | 52(PS) | 35(PS) | 44(PS) | — |
| 50.0 | — | 24(c) | 56(PS) | 99(PS) | 48(PS) | 75(PS) |
| Cloud Point, °C., 1% | 54 | 66 | 62 | 58 | 57 | 73 |
| Wetting Time, Sec. | >600 | 39 | 96 | 118 | 300 | 39 |
| Foaming and Foam Stability | | | | | | |
| Foam Height, cc | 600 | 600 | 550 | 575 | 550 | 550 |
| Time, sec., to Drain Water to Height of, cc | | | | | | |
| 100 | 5 | 50 | 52 | 40 | 50 | 60 |
| Time, sec., to Drain Water to Height of, cc | | | | | | |
| 125 | 10 | 55 | 62 | 55 | 65 | 68 |
| 150 | 12 | 65 | 75 | 70 | 75 | 78 |
| 175 | 15 | 76 | 85 | 85 | 80 | 88 |
| 200 | 20 | 95 | 150 | 140 | 140 | 142 |
| 225 | 34 | 270 | 385 | 450 | 325 | 375 |
| Surface Tension, Dynes $Cm^{-1}$ at Critical Micelle Conc. | 59.2 | 49.6 | 53.7 | 53.2 | 54.1 | 45.7 |

*see appearance code, bottom of Table 2

EXAMPLES 9 AND 10

The examples cover butanol-started fluids prepared by two-stage feed processes wherein a uniform feed stage precedes the gradient feed stage. These ethylene oxide-propylene oxide copolymers are nominally of 50/50 % w/w composition. Reactor and feed tank charges and rates are summarized in Table 5 when evaluation data are given in Table 6.

The data in Table 6 reveal strikingly the influence of this invention on fluid solution properties. Example 9 is highly efficient water-gelling fluid, a good solvent for heptane, and an effective foam stabilizer, wetter, and reducer of surface tension. Example 10, on the other hand, is a water non-geller, a poor solvent for heptane, and a totally ineffective foam stabilizer and wetter. These remarkable property differences occur despite the fact that these two fluids have, within limits of experimental error, the same overall composition.

TABLE 5

| EXAMPLE: | 9 | 10 |
|---|---|---|
| Feed Type: | 2-Stage | 2-Stage |
| Reactant Charges, g. | | |
| Polymerization Reactor | | |
| n-Butanol | 18.5 | 18.5 |
| Potassium | 2.79 | 2.79 |
| Feed Tanks, Stage 1 | | |
| Tank I (stirred) | | |
| Ethylene Oxide | 0 | 150 |
| Propylene Oxide | 150 | 0 |
| Tank II (unstirred) | | |
| Ethylene Oxide | — | — |
| Propylene Oxide | — | — |
| Feed Tanks, Stage 2 | | |
| Tank I (stirred) | | |

TABLE 5-continued

| EXAMPLE: | 9 | 10 |
|---|---|---|
| Ethylene Oxide | 0 | 225 |
| Propylene Oxide | 225 | 0 |
| Tank II (unstirred) | | |
| Ethylene Oxide | 375 | 0 |
| Propylene Oxide | 0 | 375 |
| Feed Rates, ml/hour | | |
| Stage 1 | | |
| Tank I (stirred) | 60 | 60 |
| Tank II (unstirred) | — | — |
| Stage 2 | | |
| Tank I (stirred) | 60 | 60 |
| Tank II (unstirred) | 36.5 | 38.7 |

TABLE 6

| EXAMPLE: | 9 | 10 |
|---|---|---|
| Molecular Weight (Mn) | 2375 | 2006 |
| Composition, weight % | | |
| Ethylene Oxide | 50.6 | 51.0 |
| Propylene Oxide | 49.4 | 49.0 |
| Glass Transision Temp., °C. | −66 | −65 |
| Appearance at °F.* | | |
| 32 | P | wax |
| 70 | SH | VH |
| Viscosity at °F. cks | | |
| 70 | 636 | 528 |
| 100 | 272 | 231 |
| 130 | 143 | 123 |
| 210 | 46.4 | 39.1 |
| Specific Gravity, g/cc at °F. | | |
| 70 | 1.0510 | 1.0530 |
| 130 | 1.0257 | 1.0275 |
| 210 | 0.9915 | 0.9934 |
| Surface Tension, Dynes $Cm^{-1}$ | 32.05 | 33.27 |
| 25° C. Aq. Sol. Viscosity, cps (Appearance)* at % Fluid | | |
| 100 | 525(SH) | 480(VH) |
| 90.9 | 950(GP) | 360(SH) |
| 83.3 | 18,000(G) | 285(c) |
| 76.9 | 40,000(G) | 230(c) |
| 71.4 | 180,000(G) | 200(c) |
| 66.7 | >200,000(G) | 175(c) |
| 62.5 | " | 130(c) |
| 58.8 | " | 105(c) |
| 55.5 | " | 75(c) |
| 52.6 | " | 60(c) |
| 50.0 | " | 50(c) |
| 50.0 | " | 175 |
| 50.0 at 5° C. | Gel | 175 |
| 50.0 at 45° C. | Gel | 80 |
| 25° C. Heptane Sol. Visc., cps., (Appearance) at % Fluid | | |
| 100 | 525(c) | 480(VH) |
| 83.3 | 162(c) | 128(c) |
| 71.4 | 76(c) | 62(SH) |
| 62.4 | 56(c) | 58(SH) |
| 55.0 | — | 54(PS) |
| 50.0 | 44(c) | 52(PS) |
| Cloud Pont, °C., 1% | 71 | 47 |
| Wetting Time, sec. | 35 | >600 |
| Foaming and Foam Stability | | |
| Foam Height, cc. | 550 | 500 |
| Time, sec. to Drain Water To Height of, cc. | | |
| 100 | 45 | 4 |
| 25 | 52 | 5 |
| 150 | 62 | 6 |
| 175 | 85 | 9 |
| 200 | 100 | 12 |
| 225 | 235 | 21 |
| Surface Tension, Dynes $Cm^{-1}$ | | |
| at Critical Micell Conc. | 52.5 | 55.8 |

*see appearance code, bottom of Table 2

EXAMPLES 11 AND 12

These examples cover allyl alcohol-started fluids prepared under single-stage gradient feed conditions. For comparative purposes, a sample of similar composition prepared under random feed conditions is included. The nominal overall compositions of these copolymers is 42% ethylene oxide and 58% propylene oxide. The starter solutions for these polymerizations were prepared by treating allyl alcohol with potassium hydroxide and azeotropically removing the water of neutralization with benzene. Following completion of the drying, the benzene was removed from the starter solution by distillation. Table 7 summarizes the various charges and feed rates; Table 8 contains evaluation data. Allyl alcohol-started copolymers of this type find utility as starting materials for the manufacture of silicone surfactants for flexible urethane foams.

The data in Table 8 demonstrates basic differences between the random feed sample and the two gradient feed samples of comparable composition. The two gradient feed samples, while generally similar in properties due to similarities in the feed profiles used in their preparation, nevertheless do exhibit differences in their solution property characteristics.

TABLE 7

| EXAMPLE: | C | 11 | 12 |
|---|---|---|---|
| Feed Type: | Random | 2-Stage | 2-Stage |
| Reactant Charge, g. | | | |
| Polymerization Reactor | | | |
| Allyl Alcohol | 14.5 | 14.5 | 14.5 |
| Potassium Hydroxide | 4.5 | 4.5 | 4.5 |
| Benzene | 20 | 20 | 20 |
| Feed Tank I (stirred) | | | |
| Ethylene oxide | 315 | — | — |
| Propylene oxide | 435 | 435 | 331 |
| Feed Tank II (unstirred) | | | |
| Ethylene oxide | — | 315 | 315 |
| Propylene oxide | — | — | 104 |
| Feed Rates, ml/hour | | | |
| Feed Tank I | 60 | 60 | 60 |
| Feed Tank II | — | 24.1 | 30.5 |

TABLE 8

| EXAMPLE: | C | 11 | 12 |
|---|---|---|---|
| Molecular Weight (Mn) | 1639 | 1677 | 1871 |
| Composition, weight % | | | |
| Ethylene Oxide | 43.8 | 41.4 | 44.9 |
| Propylene Oxide | 56.2 | 58.6 | 55.1 |
| Unsaturation Allylic, weight % | 1.03 | 0.93 | 0.73 |
| Unsaturation, Propenyl, weight % | 0.17 | 0.27 | 0.21 |
| Glass Transition Temp., °C. | −62 | −62 | −60 |
| Apperance at, °F.* | | | |
| 32 | clear | clear | clear |
| 70 | clear | clear | clear |
| Viscosity at °F., cks | | | |
| 70 | 634 | 728 | 915 |
| 100 | 262 | 314 | 374 |
| 130 | 139.5 | 164 | 189 |
| 210 | 43.9 | 49.3 | 55.3 |
| Specific Gravity, g/cc at °F. | | | |
| 70 | 1.0478 | 1.0454 | 1.0531 |
| 130 | 1.0221 | 1.0204 | 1.0273 |

TABLE 8-continued

| EXAMPLE: | C | 11 | 12 |
|---|---|---|---|
| 210 | 1.9879 | 0.9857 | 0.9921 |
| Surface Tension, Dynes Cm$^{-1}$ | 34.16 | 33.42 | 32.08 |
| 25° C. Aq. Sol. Visc., cps | | | |
| (Appearance)* | | | |
| at % Fluid | | | |
| 100 | 478(c) | 545 | 850(c) |
| 90.9 | 425(c) | 480(c) | 760(c) |
| 83.4 | 305(c) | 430(c) | 650(c) |
| 77.0 | 235(c) | 405(c) | 575(c) |
| 71.0 | — | 390(c) | 450(c) |
| 66.7 | 170(c) | 380(c) | 300(c) |
| 62.7 | — | 370(c) | 250(c) |
| 58.8 | 120(c) | 340(c) | 180(c) |
| 55.5 | — | 300(c) | 130(c) |
| 52.8 | 70(c) | 265(c) | 110(c) |
| 50.0 | 60(c) | 250(c) | 130(c) |
| 50.0 at 45° C. | 30(c) | 220(c) | 130(c) |
| 50.0 at 5° C. | 190(c) | 270(c) | 185(c) |
| 25° C. Heptane Sol. Visc., cps | | | |
| (Appearance)* | | | |
| at % Fluid | | | |
| 100 | 478(c) | 545(c) | 850(c) |
| 83.3 | 166(c) | 180(H) | 115(c) |
| 71.4 | 92(H) | 50(H) | 75(Sl.H.) |
| 62.4 | 82(H) | 35(PS) | 25(PS) |
| 55.0 | 92(PS) | 35(PS) | 30(PS) |
| 50.0 | 110(PS) | 50(PS) | 60(PS) |
| Cloud Point, °C., 1% | 50 | 46 | 47 |
| Wetting Time, sec. | >600 | 41 | 28 |
| Foaming and Foam Stability | | | |
| Foam Height, cc | 550 | 530 | 680 |
| Time, Sec., to Drain Water | | | |
| To Height, °F., cc | | | |
| 100 | 17 | 50 | 50 |
| 125 | 22 | 60 | 60 |
| 150 | 27 | 70 | 75 |
| 175 | 32 | 80 | 82 |
| 200 | 42 | 152 | 145 |
| 225 | 70 | 600 | 375 |
| Surface Tension, Dynes Cm$^{-1}$ | | | |
| At Critical Micelle Conc. | 56.6 | 48.0 | 45.3 |

*see appearance code, bottom of table 2

EXAMPLES 13 AND 14

These examples illustrate the control over the ratio of primary to secondary hydroxyl terminal groups which can be achieved in preparing n-butanol initiated ethylene oxide/propylene oxide copolymers of this invention which are prepared to have an average molecular weight of about 3,000 and to contain 50/50 weight percent ethylene oxide and propylene oxide. C1, C2, and C3 are presented as controls to illustrate the comparative properties of conventional random copolymers and block copolymers having similar molecular weights and total ethylene oxide/propylene oxide contents.

An initiator/catalyst solution was prepared by reacting 30 grams of potassium hydroxide pellets with 185 grams of redistilled n-butanol in the presence of 150 grams of diisopropyl ether as an azeotroping agent to remove the water of reaction. The reaction was run at reflux and 9.4 grams of water were removed in a Dean-Stark trap. The diisopropyl ether was then partially stripped off at atmospheric pressure to a temperature of about 90° C. and the stripping was finished on a rotary evaporator operating at 50° C. at 10 mm. Hg pressure. The viscous residue analyzed for an alkalinity content of 2.514 meq./gram, which is equivalent to a potassium butylate concentration of 28.1%.

The apparatus illustrated in FIG. 1 was used to prepare the copolymers. The amounts of the charges of reactants to the feed tanks and the flow rates and processing conditions are indicated in Table 9. The initiator/catalyst solution was charged directly to the reaction kettle. Upon completion of the monomers charge, the reaction mass was maintained at 110° C.–115° C. for 30 minutes. The product in the reaction kettle was analyzed for alkalinity by titration with a standard solution of 0.1 NHCl. The product was then neutralized by stirring for 1 hour at 100° C. with a 10% stoichiometric excess of glacial acetic acid which was followed by stirring for 1 hour at 110° C. with 15 grams of magnesium silicate. The product was pressure filtered while hot using a commercial Sparkler filter. 250 grams of product was finally neutralized by heating for 1 hour at 55° C. with a mixture of 25 grams each of an anion and a cation exchange resin in an 80/10 isopropanol/water mixture. The treated solution was filtered to remove the ion-exchange resins and the final product recovered by stripping to constant weight at 110° C. under a pressure of 1 mm. of mercury on a rotary evaporator.

The results of these examples illustrate that the present invention provides copolymers of ethylene oxide and propylene oxide which are liquid at 30° C. and which can have either substantially all primary hydroxyl terminal groups (e.g., greater than 90% primary groups) or substantially all secondary hydroxyl terminal groups (e.g., greater than 90% secondary groups) as desired by the skilled worker preparing them. Neither the block copolymers nor the random copolymer exhibited this combination of properties.

In these examples and those that follow the term "linear" feed type refers to a method of feeding the reactants in which the concentrations of ethylene oxide and propylene oxide in the main polymerizable feed source varied linearly with time. The term "skewed" feed type refers to a method of feeding the reactants in which the concentrations of ethylene oxide and propylene oxide in the main polymerizable feed source varied non-linearly with time. The skilled worker in the art will be able to calculate the exact concentrations of monomers in the main polymerizable feed source at any given time on the basis of the feed tank charges and feed rates given in the tables.

Table 9

| Example: | C1 | C2 | C3 | 13 | 14 |
|---|---|---|---|---|---|
| Feed Type: | Random | Blocked | Blocked | 1-Stage | 1-Stage |
| Reactant Charges, g. | | | | | |
| Polymerization Reactor | | | | | |
| Initiator/Catalyst | 17.2 | 10.02 | 9.99 | 17.6 | 15.8 |
| Feed Tank I (Stirred) | | | | | |
| Ethylene Oxide | 500 | 375(1st) | 375(2nd) | 500 | — |
| Propylene Oxide | 500 | 375(2nd) | 375(1st) | — | 450 |
| Feed Tank II (Unstirred) | | | | | |
| Ethylene Oxide | — | — | — | — | 450 |
| Proylene Oxide | — | — | — | 500 | — |

Table 9-continued

| Example: | C1 | C2 | C3 | 13 | 14 |
|---|---|---|---|---|---|
| Feed Rates, ml./hr. | | | | | |
| Feed Tank I | 60 | 60 | 60 | 60 | 60 |
| Feed Tank II | — | — | — | 31.2 | 28.8 |
| Reaction Conditions | | | | | |
| Reaction temperatures, °C. | | | 110–115 | | |
| Reaction pressure | | | Atmospheric | | |
| Acetic acid neutralizer, g. | 2.43 | 0.613 | 1.24 | 2.66 | 1.74 |
| Magnesium silicate, g. | | | 15 | | |
| Analytical Characterization | | | | | |
| Molecular Weight (Mn) | 3210 | 2920 | 3330 | 2820 | 3115 |
| Appearance at | | | | | |
| 15° C. | Clear Liquid | Solid | Solid | Slushy | Slushy |
| 30° C. | Hazy Liquid | Solid | Solid | Hazy Liquid | Clear Liquid |
| Kinematic Viscosity, cps, at | | | | | |
| 30° C. | 674 | Solid | Solid | 677.5 | 720.3 |
| 40° C. | 408.9 | Solid | Solid | 408.7 | 437.6 |
| 50° C. | 275.7 | Solid | 411.2 | 276.6 | 298.3 |
| Brookfield Viscosity, cps/°C. | 790/26 | Solid | Solid | 880/26 | 2075/25.5 |
| Specific Gravity, g./cc, 30° C. | 1.0461 | Solid | Solid | 1.0467 | 1.0489 |
| Composition Weight % | | | | | |
| Ethylene Oxide | 52.8 | 51.4 | 50.9 | 52.3 | 52.7 |
| Propylene Oxide | 47.2 | 48.7 | 49.1 | 47.7 | 47.3 |
| pH, 10% Solution | 5.0 | 3.3 | 4.2 | 4.9 | 5.4 |
| Primary Hydroxyl Content, wt. % | 16 | <3 | 92 | <3 | >95 |
| Melting Point, °C. | n/a | 43 | 46 | n/a | n/a |
| Aqueous Solution Properties | | | | | |
| Kinematic Viscosity, cps, 50% Solution at | | | | | |
| 30° C. | 76.1 | gel | gel | 105.4 | 1445 |
| 40° C. | 48.7 | gel | gel | 114.0 | 1812 |
| 50° C. | 41.3 | gel | gel | 144.2 | infinite |
| Kinematic Viscosity, cps 25% Solution at | | | | | |
| 30° C. | 9.7 | gel | 37 | 9.7 | 14.4 |
| 40° C. | 7.15 | gel | 29 | 7.4 | 16.1 |
| 50° C. | 5.5 | gel | 19.5 | 8.7 | 13.7 |
| Specific Gravity, g/cc, 50% Solution at | | | | | |
| 30° C. | 1.0540 | gel | gel | 1.0506 | 1.0473 |
| 40° C. | 1.0451 | gel | gel | 1.0390 | 1.0390 |
| 50° C. | 1.0363 | gel | gel | 1.0295 | 1.0304 |
| Specific Gravity, g/cc, 25% Solution at | | | | | |
| 30° C. | 1.0266 | gel | 1.0193 | 1.0262 | 1.0242 |
| 40° C. | 1.0232 | gel | 1.0137 | 1.0211 | 1.0170 |
| 50° C. | 1.0144 | gel | 1.0082 | 1.0111 | 1.0115 |
| Cloud Point, °F. | 56 | 75 | >100 | 54 | 70 |
| Wetting Time, Seconds | 400 | 19 | 13 | 400 | 77 |
| Surface Tension, Dyne $Cm^{-1}$, 25° C., at | | | | | |
| 0.1% | 42.55 | 40.25 | 36.5 | 41.25 | 40.0 |
| 0.05% | 45.0 | 41.15 | 37.5 | 42.15 | 40.75 |
| Foam Height, cc. | 520 | 420 | 510 | 450 | 520 |
| Time, Sec., for Foam to Drain, cc Liquid | | | | | |
| 100 | 4 | 37 | 60 | 3 | 52 |
| 125 | 6 | 47 | 75 | 4 | 60 |
| 150 | 7 | 61 | 90 | 5 | 70 |
| 175 | 10 | 76 | 100 | 6 | 85 |
| 200 | 11 | 95 | 140 | 7 | 140 |
| 225 | 20 | 126 | 550 | 8 | 560 |

EXAMPLES 15–19

These examples illustrate the control over the ratio of primary to secondary hydroxyl terminal groups which can be achieved in preparing diethylene glycol initiated ethylene oxide/propylene oxide copolymers of this invention which are prepared to have an average molecular weight of about 5,000 to 6,000 and to contain about 75% ethylene oxide and about 25% propylene oxide. C5, C6 and C7 are presented as controls to illustrate the comparative properties of conventional random copolymers and block copolymers having similar molecular weights and total ethylene oxide/propylene oxide contents.

An initiator/catalyst solution was prepared by feeding a mixture of 50% aqueous potassium hydroxide solution into an agitated, refluxing mixture of 155 grams of diethylene glycol and 150 cc of diisopropyl ether. The water of reaction and the water introduced from the caustic feed were continually removed as formed by draining off the bottom layer of the diisopropyl ether-water azeotrope. Refluxing was continued until water was no longer present in the refluxing liquid. A total of 42 grams of water was thus removed. The diisopropyl ether was then stripped off using the procedure described in Examples 1 and 2. The residual catalyst-/initiator solution was a viscous, amber-colored liquid having an alkalinity content of 2.47 meq./gram, corresponding to a potassium ethylene glycolate content of 35.6% by weight.

The apparatus illustrated in FIG. 1 was used to prepare the copolymers. The amounts of charges of reactants to the feed tanks and the flow rates and processing conditions are indicated in Table 10. The initiator/-catalyst solution was charged directly to the reaction kettle. After completion of the monomers charge, the procedure employed to prepare and recover the product was similar to that of Examples 13 and 14.

The results of these examples illustrate that a broad range of ratios of primary to secondary hydroxyl terminal groups is obtainable in the copolymers of this invention without changing the overall monomer content or substantially changing the molecular weight.

TABLE 10

| Example: | C4 | C5 | C6 | 15 | 16 | 17 | 18 | 19 |
|---|---|---|---|---|---|---|---|---|
| Feed Type: | Random | Blocked | Blocked | 1-Stage Linear | 1-Stage Linear | 1-Stage Linear | 1-Stage Linear | 1-Stage Linear |
| Reactant Charges, g. | | | | | | | | |
| Polymerization Reactor | | | | | | | | |
| Initiator/Catalyst | 10.6 | 10.7 | 10.6 | 10.6 | 10.6 | 10.6 | 10.6 | 10.6 |
| Feed Tank I (Stirred) | | | | | | | | |
| Ethylene Oxide | 562.5 | 562.5 (2nd) | 565.5 (1st) | 375 | 187.5 | 206.25 | 225 | 243.75 |
| Propylene Oxide | 187.5 | 187.5 (1st) | 187.5 (2nd) | — | 187.5 | 168.75 | 150 | 131.25 |
| Feed Tank II (Unstirred) | | | | | | | | |
| Ethylene Oxide | — | — | — | 187.5 | 375 | 356.25 | 337.5 | 318.75 |
| Propylene Oxide | — | — | — | 187.5 | — | 18.75 | 37.5 | 56.25 |
| Feed Rates, ml./hr. | | | | | | | | |
| Feed Tank I | 60 | 60 | 60 | 60 | 60 | 60 | 60 | 60 |
| Feed Tank II | — | — | — | 30.5 | 29.5 | 29.5 | 29.6 | 29.8 |
| Reaction Conditions | | | | | | | | |
| Reaction temperature, °C. | ← | ← | ← | 110–115 | → | → | → | → |
| Reaction pressure | ← | ← | ← | Atmospheric | → | → | → | → |
| Acetic acid neutralizer, g. | 1.39 | 1.17 | 1.12 | 1.86 | 1.43 | 1.44 | 1.22 | 1.73 |
| Magnesium silicate, g. | ← | ← | ← | 15 | → | → | → | → |
| Analytical Characterization | | | | | | | | |
| Molecular Weight (Mn) | 6180 | 4940 | 5615 | 5836 | 5990 | 6060 | 6060 | 6358 |
| Appearance at | | | | | | | | |
| 15° C. | clear liquid | solid | solid | slushy | semi-solid | hazy liquid | hazy liquid | semi-solid |
| 30° C. | clear liquid | solid | solid | clear liquid | clear liquid | clear liquid | clear liquid | clear liquid |
| Kinematic Viscosity, cps at | | | | | | | | |
| 30° C. | 2840 | solid | solid | 2984 | 2468 | 2372 | 2447 | 3338 |
| 40° C. | 1768 | solid | solid | 1839 | 1534 | 1486 | 1531 | 1763 |
| 50° C. | 1171 | 587 | solid | 1211 | 1021 | 989 | 1020 | 1170 |
| Brookfield Viscosity, cps/°C. | 3575/27 | solid | solid | 3970/27 | 3460/26.5 | 3775/25 | 3270/26 | 4000/24 |
| Specific Gravity, g/cc, 30° C. | 1.0831 | — | — | 1.0852 | 1.0843 | 1.0816 | 1.0833 | 1.0842 |
| Composition, Weight % | | | | | | | | |
| Ethylene Oxide | 72.5 | 77.8 | 78.5 | 74.9 | 74.2 | 72.5 | 76.7 | 76.7 |
| Propylene Oxide | 27.5 | 22.2 | 21.5 | 25.1 | 25.8 | 27.5 | 23.3 | 23.3 |
| pH, 10% Solution | 4.7 | 5.0 | 5.5 | 4.8 | 4.6 | 4.6 | 4.2 | 5.4 |
| Primary Hydroxyl Content, % | 39 | 96 | 3 | 23 | 100 | 85 | 68 | 43 |
| Melting Point, °C. | | 48–50 | 53–54 | 28–29 | | | | |
| Aqueous Solution Properties | | | | | | | | |
| Kinematic Viscosity, cps, 50% solution at | | | | | | | | |
| 30° C. | 162.1 | 276.9 | 257.8 | 155.7 | 139.3 | 141 | 145.4 | 149.6 |
| 40° C. | 108.6 | 304 | 218.1 | 106 | 94.1 | 95.1 | 95.7 | 100.7 |
| 50° C. | 77 | 310 | 192.1 | 75.7 | 66.8 | 67.5 | 68.1 | 71.9 |
| Kinematic Viscosity cps, 25% Solution at | | | | | | | | |
| 30° C. | 16.8 | 11.4 | 17.5 | 16.9 | 15.5 | 15.6 | 15.3 | 16.5 |
| 40° C. | 12.5 | 9.0 | 13.3 | 12.6 | 11.5 | 11.6 | 11.8 | 12.2 |
| 50° C. | 9.6 | 9.2 | 10.8 | 9.7 | 8.8 | 8.8 | 9.0 | 9.4 |
| Specific gravity, g/cc, 25% solution at | | | | | | | | |
| 30° C. | 1.0705 | 1.0659 | 1.0690 | 1.0715 | 1.0712 | 1.0706 | 1.0712 | 1.0711 |
| 40° C. | 1.0628 | 1.0578 | 1.0609 | 1.0636 | 1.0634 | 1.0626 | 1.0633 | 1.0633 |
| 50° C. | 1.0546 | 1.0497 | 1.0523 | 1.0555 | 1.0552 | 1.0545 | 1.0552 | 1.0550 |
| Specific gravity, g/cc, 25% solution at | | | | | | | | |
| 30° C. | 1.0339 | 1.0334 | 1.0336 | 1.0341 | 1.0341 | 1.0336 | 1.0340 | 1.0339 |
| 40° C. | 1.0286 | 1.0273 | 1.0281 | 1.0288 | 1.0288 | 1.0281 | 1.0286 | 1.0286 |
| 50° C. | 1.0226 | 1.0203 | 1.0220 | 1.0229 | 1.0203 | 1.0223 | 1.0227 | 1.0226 |
| Cloud Point, °C. | 89 | >100 | 82 | 93 | 88 | 87 | 93 | 88 |
| Wetting Time, seconds | >400 | >400 | >400 | >400 | >400 | >400 | >400 | >400 |
| Surface tension, Dyne cm$^{-1}$, 25° C. | | | | | | | | |
| 0.1% | 44.75 | 37.3 | 41.7 | 50.6 | 50.2 | 50.40 | 51.5 | 47.1 |

TABLE 10-continued

| Example: | C4 | C5 | C6 | 15 | 16 | 17 | 18 | 19 |
|---|---|---|---|---|---|---|---|---|
| 0.05 | 48.0 | 40.2 | 44.55 | 50.75 | 50.5 | 51.5 | 51.5 | 51.0 |
| Foam Height, cc | 540 | 550 | 500 | 525 | 610 | 550 | 560 | 600 |
| Time, sec., for foam to drain, cc liq. | | | | | | | | |
| 100 | 5 | 65 | 8/4 | 52 | 42 | 45 | 45 | |
| 125 | 6 | 75 | 9 | 5 | 66 | 54 | 56 | 56 |
| 150 | 7 | 95 | 12 | 6 | 76 | 68 | 69 | 67 |
| 175 | 8 | 135 | 18 | 7 | 90 | 83 | 85 | 81 |
| 200 | 11 | 225 | 33 | 8 | 123 | 123 | 110 | 124 |
| 225 | 18 | 235 | 80 | 10 | 230 | 320 | 290 | 250 |

EXAMPLES 20-24

These examples illustrate the control over the ratio of primary to secondary hydroxyl terminal groups which can be achieved in preparing glycerine initiated ethylene oxide/propylene oxide copolymers of this invention which are prepared to have an average molecular weight of about 3,500 to 4,000 and to contain about 25% ethylene oxide and 75% propylene oxide. C8, C9 and C10 are presented as controls to illustrate the comparative properties of conventional random copolymers and block copolymers having similar molecular weights and total ethylene oxide/propylene oxide contents.

An initiator/catalyst solution was prepared by reacting 135 grams (1.46 moles) of glycerine with 35 grams of 50% aqueous potassium hydroxide in the presence of 150 ml. of diisopropyl ether as an azeotroping agent to remove water from the reaction system. The charge was heated at reflux until no further water could be collected in a Dean-Stark trap attached to the condenser. Stripping of the diisopropyl ether was accomplished by heating to a kettle temperature of 110° C., after which the pressure was reduced to 250 mm of Hg while stripping was continued. Traces of ether were removed by heating to 50° C. at 10 mm Hg pressure in a rotary evaporator. The highly viscous residue, which was almost solid at room temperature, analyzed for an alkalinity content of 3.17 meq./gram, which is equivalent to 41.6% by weight calculated as potassium glycerolate.

The apparatus illustrated in the FIG. 1 was used to prepare the copolymers. The amounts of charges of reactants to the feed tanks and the flow rates and processing conditions are indicated in Table 11. The initiator/catalyst solution was charged directly to the reaction kettle. After completion of the monomers charge, the procedure employed to prepare and recover the product was similar to that of Examples 13 and 14.

The results of these examples further illustrate that a broad range of ratios of primary to secondary hydroxyl terminal groups is obtainable in the copolymers of this invention independently of overall chain structure or monomers content.

Table 11

| Example: | C7 | C8 | C9 | 20 | 21 | 22 | 23 | 24 |
|---|---|---|---|---|---|---|---|---|
| Feed Type | Random | Blocked | Blocked | 1-Stage Linear | 1-Stage Linear | 2-Stage, 50% Block 50% Linear | 2-Stage, 25% Block 75% Skewed | 2-Stage, 60% Random 40% Skewed |
| Reactant Charges, g. | | | | | | | | |
| Polymerization Reactor | | | | | | | | |
| initiator/Catalyst | 18.25 | 15.32 | 15.4 | 18.3 | 18.4 | 18.3 | 15.4 | 18.4 |
| Feed Tanks, Stage 1 | | | | | | | | |
| Tank I (Stirred) | | | | | | | | |
| Ethylene Oxide | 187.5 | 187.5(2nd) | 157(1st) | 187.5 | — | — | — | 45 |
| Propylene Oxide | 562.5 | 526.5(1st) | 470(2nd) | 187.5 | 375 | 375 | 157 | 405 |
| Tank II (Unstirred) | | | | | | | | |
| Ethylene Oxide | — | — | — | — | 187.5 | — | — | — |
| Propylene Oxide | — | — | — | 375 | 187.5 | — | — | — |
| Feed Tanks, Stage 2 | | | | | | | | |
| Tank I (Stirred) | | | | | | | | |
| Ethylene Oxide | — | — | — | — | — | — | | 17.5 |
| Propylene Oxide | — | — | — | — | — | 187.5 | 313 | 157.5 |
| Tank II (Stirred) | | | | | | | | |
| Ethylene Oxide | — | — | — | — | — | 187.5 | 157 | 125 |
| Propylene Oxide | — | — | — | — | — | — | — | — |
| Feed Rates, ml./hr. | | | | | | | | |
| Stage 1 | | | | | | | | |
| Tank I | 60 | 60 | 60 | 60 | 60 | 60 | 60 | 60 |
| Tank II | — | — | — | 30.5 | 29.5 | — | — | — |
| Stage 2 | | | | | | | | |
| Tank I | — | — | — | — | — | 60 | 60 | 60 |
| Tank II | — | — | — | — | — | 28.9 | 19 | 24 |
| Reaction Conditions | | | | | | | | |
| Reaction temperature, °C. | ← | ← | ← | 110-115 | → | → | → | → |
| Reaction pressure | ← | ← | ← | Atmospheric | → | → | → | → |
| Acetic cid neutralizer, g. | 3.77 | 2.8 | 2.65 | 4.22 | 3.6 | 3.23 | 2.77 | 3.48 |
| Magnesium silicate, g. | 15 | 13 | 13 | 15 | 15 | 15 | 13 | 15 |
| Analytical Characterization | | | | | | | | |
| Molecular Weight, Mn | 4058 | 3835 | 3772 | 3760 | 3840 | 3480 | 3665 | 3755 |
| Physical State, 25° C. | Liquid | Liquid | Liquid | Liquid | Liquid | Liquid | Liquid | Liquid |
| Brookfield Viscosity, cps/°C. | 772/26 | 730/26 | 770/25 | 712/26.5 | 605/26.5 | 535.27 | 66/25 | 655/26 |
| Composition, Wt. % | | | | | | | | |

Table 11-continued

| Example: | C7 | C8 | C9 | 20 | 21 | 22 | 23 | 24 |
|---|---|---|---|---|---|---|---|---|
| Ethylene Oxide | 26.1 | 25.3 | 24.7 | 25.4 | 25.4 | 25.6 | 22.6 | 27.8 |
| Propylene Oxide | 73.9 | 74.7 | 75.3 | 74.6 | 74.6 | 74.4 | 77.4 | 72.2 |
| pH 10% Solution | 5.5 | 4.9 | 5.6 | 4.9 | 4.8 | 4.6 | 4.6 | 5.4 |
| Primary Hydroxyl Content, Wt. % | 6 | 91 | 3 | 5 | 12 | 94 | 40 | 49 |
| Water Solubility, Wt. % | 2.44 | 30(Gels) | 50 | 2.91 | 2.91 | 3.28 | 3.84 | 2.91 |
| 1,4-Butanediol Solubility, % | 13.8 | 34.2 | 16.7 | 13.8 | 16.2 | 23.1 | 19.3 | 19.3 |
| Aqueous Solution Properties | | | | | | | | |
| Cloud Point, °C. (0.5% solution) | 38 | 51 | 37.5 | 38 | 38 | 45 | 33 | 36 |
| Wetting Time, secons | 37 | 5 | 23 | 30 | 56 | 6 | 14 | 25 |
| Foam Height, cc | 510 | 450 | 500 | 510 | 550 | 450 | 500 | 550 |
| Time, Seconds, for foam to drain 225 cc liquid | 18 | 250 | 200 | 17 | 175 | 105 | 220 | 200 |

What is claimed is:

1. Polymer of a starter and at least two different 1,2-epoxide monomers capable of ring-opening, addition polymerization with themselves and each other, said polymers being characterized by polymer chains attached to said starter and along which the proportion of mer units provided by a first said monomer in a given chain length gradually increases as the proportion of mer units provided by a second said monomer gradually decreases, said characterizing polymer chains being produced by the process which comprises: introducing a starter and at least one primary polymerizable feed composition comprising at least one 1,2-epoxide monomer capable of ring-opening, addition polymerization from at least one primary feed source to a polymerization zone, said primary polymerizable feed composition continually varying in compositional content of the 1,2-epoxide monomers therein during said continuous introduction; simultaneously adding to said primary feed source at least one different 1,2-epoxide monomer capable of ring-opening, addition polymerization with itself and said first mentioned monomer, from at least one secondary feed source so as to continually change the compositional content of the polymerizable monomers in said primary polymerizable feed composition in said primary feed source; and continuously polymerizing the primary polymerizable feed composition introduced to the polymerization zone until the desired polymerization has been achieved.

2. Polymer as claimed in claim 1 wherein adjacent one end of said given polymer chain lengths the proportion of mer units provided by said first monomer is substantially 100% and the proportion of mer units provided by said second monomer is substantially 0%.

3. Polymer as claimed in claim 1 wherein adjacent one end of said given chain lengths the proportion of mer units provided by said first monomer is substantially 100% and the proportion of mer units provided by said second monomer is substantially 0% and adjacent other end of said polymer chains the proportion of mer units provided by said first monomer is substantially 0% and the proportion of mer units provided by said second monomer is substantially 100%.

4. Polymer as claimed in claim 1 wherein said polymer chains along which the proportion of mer units provided by said first monomer for said given chain length gradually increases as the proportion of mer units provided by said second monomer along said given chain length gradually decreases are attached to second chain lengths along which the proportion of mer units provided by said first and second monomers, respectively, remain substantially constant throughout said second chain lengths.

5. Polymer as claimed in claim 4 wherein said polymer chains comprise third chain lengths connected to said second chain lengths along which the proportion of mer units provided by said first monomer gradually increases as the proportion of mer units provided by said second monomer gradually decreases.

6. Polymer as claimed in claim 4 wherein the proportion of mer units provided by said first monomer in said second chain lengths is zero.

7. Polymer as claimed in claim 4 wherein the proportion of mer units provided by said second monomer in said second chain lengths is zero.

8. Polymer as claimed in claim 1 wherein the proportion of mer units provided by said first and second monomers adjacent each end of said given chain lengths is greater than zero but less than 100%.

9. Polymer as claimed in claim 2 wherein adjacent the other end of said given polymer chain lengths the proportion of mer units provided by said first and second monomers is greater than zero but less than 100%.

10. Polymer as claimed in claim 1 wherein said first monomer is ethylene oxide and said second monomer is 1,2-propylene oxide and said polymer is butanol-started.

11. Polymer as claimed in claim 10 wherein the overall amount of ethylene oxide polymerized therein is about 40 to 50 wt. % and the overall amount of 1,2-propylene oxide polymerized therein is about 60 to 50 wt. %.

12. Polymer as claimed in claim 1 wherein said first monomer is ethylene oxide and said second monomer is 1,2-propylene oxide and said polymer is allyl alcohol-started.

13. Polymer as claimed in claim 12 wherein the overall amount of ethylene oxide polymerized therein is about 40 to 50 wt. % and the overall amount of 1,2-propylene oxide polymerized therein is about 60 to 50 wt. %.

14. A process for producing a polymer comprising introducing a starter and at least one primary polymerizable feed composition comprising at least one 1,2-epoxide monomer capable of ring-opening, addition polymerization from at least one primary feed source to a polymerization zone, said primary polymerizable feed composition continually varying in compositional content of the polymerizable monomers therein during said continuous introduction; simultaneously adding to said primary feed source at least one different secondary polymerizable feed composition comprising at least one different 1,2-epoxide monomer capable of ring-opening, addition polymerization with itself and said first mentioned monomer, from at least one secondary feed source so as to continually change the compositional content of the polymerizable monomers in said primary polymerizable feed composition in said primary feed source; and continuously polymerizing the primary polymerizable feed composition introduced to the polymerization zone until desired polymerization has been achieved.

15. A process as claimed in claim 14 wherein a single primary feed source introduces primary polymerizable feed composition to the polymerization zone while a single secondary feed source simultaneously introduces secondary polymerizable feed composition to said primary feed source.

16. Process as claimed in claim 14 wherein said primary feed composition initially is 1,2-propylene oxide and said secondary feed composition is ethylene oxide.

17. Process as claimed in claim 14 wherein said primary feed composition initially is ethylene oxide and said secondary feed composition is 1,2-propylene oxide.

18. Process as claimed in claim 14 wherein said primary feed composition initially is 1,2-propylene oxide and said secondary feed composition is a mixture of ethylene oxide and 1,2-propylene oxide.

19. Process as claimed in claim 14 wherein said primary feed composition initially is a mixture of ethylene oxide and 1,2-propylene oxide and second secondary feed composition is ethylene oxide.

20. Process as claimed in claim 14 wherein, after the primary polymerizable feed composition is polymerized, a second stage primary polymerizable composition is introduced into the polymerization zone and a second stage secondary polymerizable composition is introduced into the second stage primary polymerizable feed composition so as to continually change its compositional content of polymerizable monomers and the second stage primary polymerizable feed composition introduced into the polymerization zone is continuously polymerized.

21. Process as claimed in claim 20 wherein the first stage primary polymerizable feed composition comprises 1,2-propylene oxide, the first stage secondary polymerizable feed composition comprises a mixture of ethylene oxide and 1,2-propylene oxide, the second stage primary polymerizable feed composition comprises a mixture of ethylene oxide and 1,2-propylene oxide and the second stage secondary polymerizable feed composition comprises ethylene oxide.

22. Process as claimed in claim 20 wherein the first stage primary polymerizable feed composition comprises a mixture of ethylene oxide and 1,2-propylene oxide, the first stage secondary polymerizable feed composition comprises a different mixture of ethylene oxide and 1,2-propylene oxide, the second stage primary polymerizable feed composition comprises a mixture of ethylene oxide and 1,2-propylene oxide and the second stage secondary polymerizable feed composition comprises another mixture of ethylene oxide and 1,2-propylene oxide.

23. Process as claimed in claim 14 wherein 1,2-propylene oxide is introduced into and polymerized in said polymerization zone prior to introduction of said primary and/or secondary polymerizable compositions into and polymerization thereof in said polymerization zone and wherein said primary polymerizable feed composition is 1,2-propylene oxide and said second secondary polymerizable feed composition is ethylene oxide.

24. Process as claimed in claim 14 wherein ethylene oxide is introduced into and polymerized in said polymerization zone prior to introduction of said primary and/or secondary polymerizable compositions into and polymerization thereof in said polymerization zone and wherein said primary polymerizable feed composition is ethylene oxide and said second secondary polymerizable feed composition is 1,2-propylene oxide.

25. Process as claimed in claim 14 wherein said polymerization zone is charged with butanol as a starter and an alkaline catalyst.

26. Process as claimed in claim 14 wherein said polymerization zone is charged with allyl alcohol as a starter and an alkaline catalyst.

27. A copolymer of (a) ethylene oxide and (b) at least one other 1,2-epoxide monomer which undergoes ring-opening addition polymerization in the presence of an active hydrogen containing initiator to form a secondary hydroxyl terminal group, said copolymer having a controlled ratio of primary to secondary hydroxyl terminal groups and which is produced by continuously introducing at least one main polymerizable feed composition from a main feed source to a polymerization zone, said main polymerizable feed composition continually varying in compositional content of (a) and (b) therein during said continuous introduction; simultaneously adding to said main feed source and thoroughly mixing therein at least one different auxiliary feed composition from at least one auxiliary feed source so as to continually change the compositional content of (a) and (b) in said main polymerizable feed source; and polymerizing the main polymerizable feed composition introduced to the polymerization zone until desired polymerization has been achieved.

28. A copolymer as claimed in claim 27 wherein (a) is ethylene oxide and (b) is propylene oxide.

29. A copolymer as claimed in claim 28, wherein said copolymer is a liquid at 30° C. and at least 90 weight percent of its terminal hydroxyl groups are primary hydroxyl groups.

30. A copolymer as claimed in claim 28, wherein said copolymer is a liquid at 30° C. and at least 90 weight percent of its terminal hydroxyl groups are secondary hydroxyl groups.

* * * * *

UNITED STATES PATENT AND TRADEMARK OFFICE
CERTIFICATE OF CORRECTION

PATENT NO. : 4,195,167
DATED : March 25, 1980
INVENTOR(S) : Robert J. Knopf et al.

It is certified that error appears in the above—identified patent and that said Letters Patent is hereby corrected as shown below:

Column 15, line 63, "Lenghts—" should read --Lengths--

Column 16, line 41, "Concentration-s" should read -- Concentrations- -- .

Column 18, Table 2, under the heading "2", 4th line from bottom, "270"A" should be -- 270PS -- .

Column 19 and 20, Table 2-continued, under the column headed "3", the "Foam Height,cc", "600" should be deleted and -- 550 -- substituted therefor; under the column headed "4", the "Foam Height,cc", "550" should be deleted and -- 600 -- substituted therefor; under the column headed "B", the "Foam Height,cc", insert -- 550 -- .

UNITED STATES PATENT AND TRADEMARK OFFICE
CERTIFICATE OF CORRECTION

PATENT NO. : 4,195,167
DATED : March 25, 1980
INVENTOR(S) : Robert J. Knopf et al.

It is certified that error appears in the above—identified patent and that said Letters Patent is hereby corrected as shown below:

Column 20, Table 3, under the heading "8", the "Feed Rate" for "Stage 2", "Tank I", insert -- 60 -- .

Column 20, Table 4, in the column headed "6", the "Average Sequence Length" for "Ethylene Oxide", ".38" should be deleted and -- 3.88 -- substituted therefor.

Column 23, Table 6, under the column head "Example", "25°C. Aq. Sol. Viscosity,cps (Apppearance)* at % Fluid" delete the numeral "50", (second occurrence), under the column headed "9", delete ditto marks ("); under the column headed "10", delete "175"; under the column headed "Example", "Time, sec. to Drain Water To Height of, cc." delete the numeral "25" and substitute -- 125 -- therefor,

UNITED STATES PATENT AND TRADEMARK OFFICE
CERTIFICATE OF CORRECTION

PATENT NO. : 4,195,167
DATED : March 25, 1980
INVENTOR(S) : Robert J. Knopf et al.

It is certified that error appears in the above—identified patent and that said Letters Patent is hereby corrected as shown below:

Column 25, Table 8 - continued, under the column headed "12", delete the "Viscosity at % Fluid for" "71.0", "66.7", "62.7", "58.8", "55.5", "52.8", and "50.0", respectively, and insert therefor: for 71.0% Fluid, -- 510 --, for 66.7% Fluid, -- 450 -- ; for 62.7% Fluid, -- 300 -- ; for 58.8% Fluid, -- 250 -- ; for 55.5% Fluid, -- 180 --; for 52.8% Fluid, -- 130 -- ; for 50.0% Fluid, -- 110 -- .

Columns 27 and 28, Table 9-continued, under the heading "Example", and after sub-heading "Aqueous Solution Properties", Cloud Point, °F. should read -- Cloud Point, °C. -- .

UNITED STATES PATENT AND TRADEMARK OFFICE
CERTIFICATE OF CORRECTION

PATENT NO. : 4,195,167

DATED : March 25, 1980

INVENTOR(S) : Robert J. Knopf et al.

It is certified that error appears in the above—identified patent and that said Letters Patent is hereby corrected as shown below:

Columns 29 and 30, Table 10, under the heading "Example" and subheading "Aqueous Solution Properties", for "Specific Gravity, g/cc," delete "25% solution at" and insert -- 50% solution at -- ; under the column headed "16" and the subheading "Aqueous Solution Properties", "Specific gravity,g/cc ," for "50°C.", delete "1.0203" and insert -- 1.0230 -- ; under the column headed "19" and the subheading "Aqueous Solution Properties", "Specific gravity,g/cc," for "40°C.", delete "1.0633" and insert -- 1.0631 -- .

UNITED STATES PATENT AND TRADEMARK OFFICE
CERTIFICATE OF CORRECTION

PATENT NO. : 4,195,167
DATED : March 25, 1980
INVENTOR(S) : Robert J. Knopf et al.

It is certified that error appears in the above—identified patent and that said Letters Patent is hereby corrected as shown below:

Columns 31 and 32, Table 10-continued, in the column headed "Example:", "Time, sec., for foam to drain, cc liq." at "100", under the column headed "C6" delete "8/4 and insert -- 8 --; under the column headed "15", delete "52" and insert -- 4 --; under the column headed "16", delete "42" and insert -- 52 --; under the column headed "17", delete "45" and insert -- 42 --; under the column headed "19", insert -- 45 -- .

Columns 31 and 32, Table 10-continued, in the column headed "Example:", "Time, sec., for foam to drain, cc. liq." at "225", under the column headed "C5", delete "235" and insert -- 735 -- .

UNITED STATES PATENT AND TRADEMARK OFFICE
CERTIFICATE OF CORRECTION

PATENT NO. : 4,195,167
DATED : March 25, 1980
INVENTOR(S) : Robert J. Knopf et al.

It is certified that error appears in the above—identified patent and that said Letters Patent is hereby corrected as shown below:

Columns 31 and 32, Table 11, in the column headed "Polymerization Reactor", "Initiator/Catalyst" and under the column headed "20", change the numeral "18.3" to read -- 18.4 --; under the column headed "Example", and the sub-heading "Reaction Conditions", change "Acetic cid neutralizer, g." to read -- Acetic acid neutralizer, g. -- .

Signed and Sealed this

Twenty-fourth Day of November 1981

[SEAL]

Attest:

GERALD J. MOSSINGHOFF

*Attesting Officer*  *Commissioner of Patents and Trademarks*